(12) United States Patent
Schwartz et al.

(10) Patent No.: US 11,810,034 B2
(45) Date of Patent: Nov. 7, 2023

(54) VARIABLE RESOURCE ALLOCATION

(71) Applicant: KARDIN SYSTEMS INC., Snoqualmie, WA (US)

(72) Inventors: Adam Schwartz, Sammamish, WA (US); Vince Rohr, Sammamish, WA (US)

(73) Assignee: Kardin Systems Inc., Snoqualmie, WA (US)

( * ) Notice: Subject to any disclaimer, the term of this patent is extended or adjusted under 35 U.S.C. 154(b) by 400 days.

(21) Appl. No.: 16/179,694

(22) Filed: Nov. 2, 2018

(65) Prior Publication Data
US 2020/0143304 A1 May 7, 2020

(51) Int. Cl.
*G06Q 10/0631* (2023.01)
*G06F 3/0482* (2013.01)

(52) U.S. Cl.
CPC ..... *G06Q 10/06312* (2013.01); *G06F 3/0482* (2013.01)

(58) Field of Classification Search
CPC .................. G06Q 10/06312; G06F 3/0482
USPC ........................................................ 705/7.22
See application file for complete search history.

(56) References Cited

U.S. PATENT DOCUMENTS

| | | | |
|---|---|---|---|
| 5,303,146 A | 4/1994 | Ammirato et al. | |
| 8,224,472 B1 * | 7/2012 | Maluf | G06Q 10/063116 700/97 |
| 8,307,174 B1 * | 11/2012 | Misra | G06F 3/0656 711/170 |
| 10,878,354 B1 * | 12/2020 | Zbikowski | G06Q 10/06315 |
| 2005/0004856 A1 * | 1/2005 | Brose | G06Q 40/08 705/35 |
| 2009/0138307 A1 * | 5/2009 | Belcsak | G06Q 40/06 705/36 R |
| 2016/0171089 A1 * | 6/2016 | Richard | G06Q 30/0202 707/741 |
| 2017/0269844 A1 * | 9/2017 | Paley | G06F 3/0619 |
| 2018/0046926 A1 * | 2/2018 | Achin | G06Q 10/04 |

OTHER PUBLICATIONS

"ChargeView: An Integrated Tool for Implementing Chargeback in IT Systems", Agarwala, 2008 (Year: 2008).*
Microsoft Project 2013 Quick Start Guide, 6 pages.
(Continued)

*Primary Examiner* — Charles Guiliano
*Assistant Examiner* — Po Han Lee
(74) *Attorney, Agent, or Firm* — SHOOK, HARDY & BACON L.L.P.

(57) ABSTRACT

Conventional resource management systems often merely assign resource data to accounts determined on a yearly basis, which does not provide an efficient means of planning for changes at a more granular level, or for making adjustments if an allocation needs to be modified during a budget period. An embodiment of the invention provides a method for managing modifications to an allocation. Modifications to an allocation may be represented as deltas, and the deltas may be evaluated against a set of rules to determine a precedence for selectively applying the deltas. The deltas may be selectively applied to the allocation according to the precedence to generate an allocation instance, and the allocation instance may be adapted into a location of a user interface.

20 Claims, 21 Drawing Sheets

(56) References Cited

OTHER PUBLICATIONS

VAX/VMS Software, Language and Tools Handbook, Copyright 1985, Digital Equipment Corporation, 261 pages. [Uploaded in two parts].
Submitted as Evidence in Support of Applicant's Arguments in the Response Filed May 2, 2022: Dinesh Pahari, SAN Copy Data Migration: A Complete Experience, EMC Proven Professional Knowledge Sharing, 18 Pages, 2012.
Submitted as Evidence in Support of Applicant's Arguments in the Response Filed May 2, 2022: EMC Corporation, EMC ClariiON CX Series Data Sheet, 7 Pages, 2006.
Submitted as Evidence in Support of Applicant's Arguments in the Response Filed May 2, 2022: Email from Examiner Lee to Mollie M. Smith, Apr. 20, 2022.

\* cited by examiner

Figure 7:
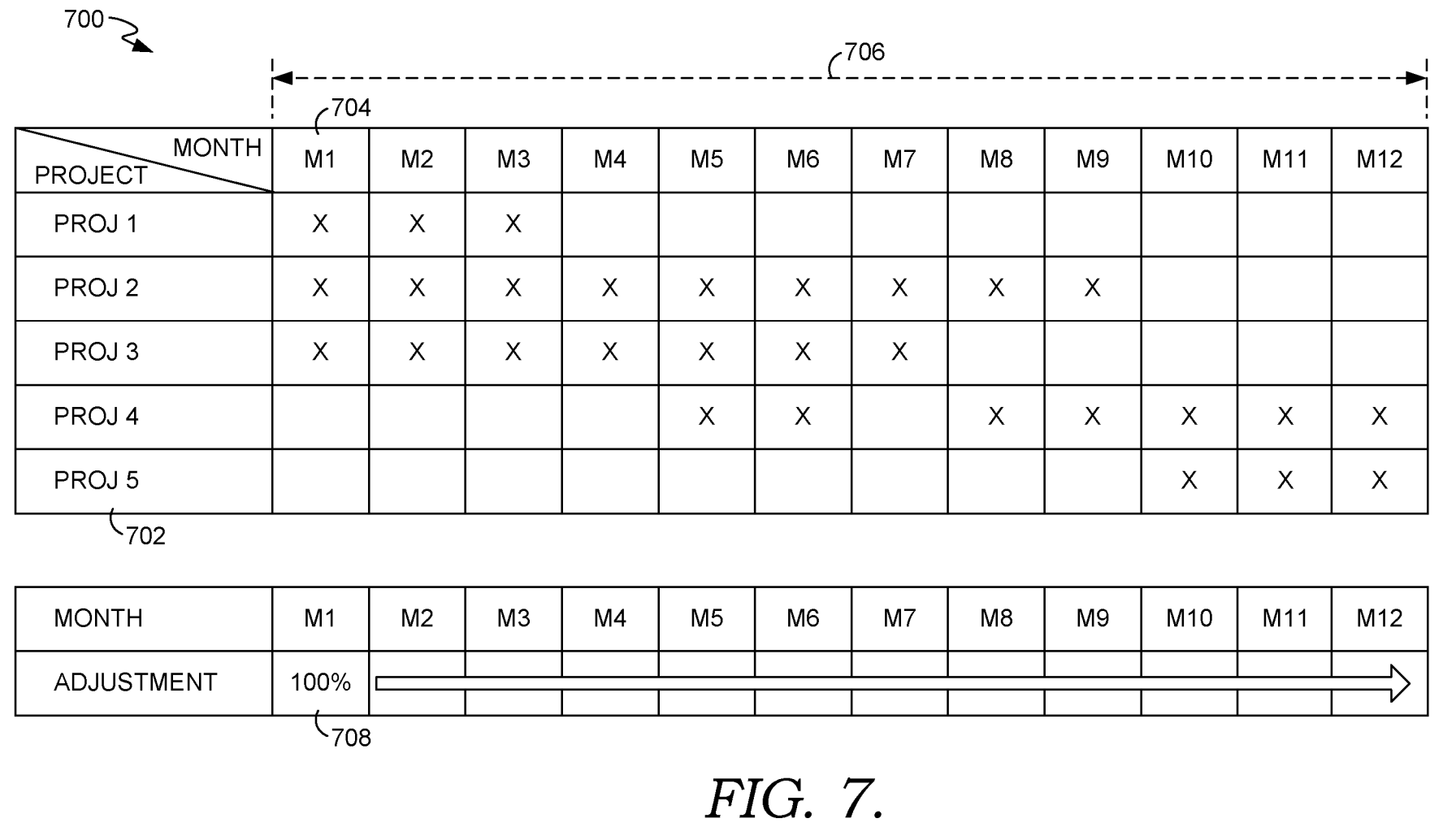

| MONTH / PROJECT | M1 | M2 | M3 | M4 | M5 | M6 | M7 | M8 | M9 | M10 | M11 | M12 |
|---|---|---|---|---|---|---|---|---|---|---|---|---|
| PROJ 1 | X | X | X | | | | | | | | | |
| PROJ 2 | X | X | X | X | X | X | X | X | X | | | |
| PROJ 3 | X | X | X | X | X | X | X | | | | | |
| PROJ 4 | | | | | | X | | X | X | X | X | X |
| PROJ 5 | | | | | | | | | | X | X | X |

| MONTH | M1 | M2 | M3 | M4 | M5 | M6 | M7 | M8 | M9 | M10 | M11 | M12 |
|---|---|---|---|---|---|---|---|---|---|---|---|---|
| ADJUSTMENT | 100% | | | | | | | | | | | |

| ADD ALLOCATION | |
|---|---|
| ALLOCATION NAME: [          ] | SUSPEND: ☐ — 934 |
| ALLOCATION TYPE: [COST CENTER ▼] — 902 | |
| ALLOCATION PLAN: [USER DEFINED PERCENTAGES ▼] — 906 | 904 |
| PAYROLL: ☐ — 908 | |
| MARKUPS: ☐ — 910 | |

ALLOW OVER ALLOCATIONS: ☑ — 912
    WARN: ☐ — 914
    POST AS: [NEGATIVE VALUE ▼] — 916
    POST TO COST CENTER: [COST CENTER ID ▼] [COST CENTER NAME ▼]
                      918             920

ALLOW UNDER ALLOCATIONS: ☑ — 922
    WARN: ☐ — 924
    POST AS: [NEGATIVE VALUE ▼] — 926
    POST TO COST CENTER: [COST CENTER ID ▼] [COST CENTER NAME ▼]
                        928             930

DESCRIPTION: [THIS IS A DESCRIPTION OF THE ALLOCATION.] — 932

[SAVE]  [CANCEL]

*FIG. 9.*

| ID | ALLOCATION | BUDGET YEAR | MONTH | REVISION TYPE | ALLOCATION TYPE |
|---|---|---|---|---|---|
| 1 | ALLOC 1 | | | | CC |
| 2 | ALLOC 1 | 2018 | | BUDGET | CC |
| 3 | ALLOC 1 | 2018 | 3 | BUDGET | CC |
| 4 | ALLOC 1 | 2018 | 4 | REFORECAST | CC |
| 5 | ALLOC 1 | 2018 | 6 | REFORECAST M6 | CC |
| 6 | ALLOC 1 | 2018 | 6 | REFORECAST H1 | CC |
| 7 | ALLOC 1 | 2018 | 6 | REFORECAST Q2 | CC |
| 8 | ALLOC 1 | 2018 | 7 | REFORECAST | CC |
| 9 | ALLOC 1 | 2018 | 11 | REFORECAST | CC |
| 10 | ALLOC 1 | 2019 | | BUDGET | CC |
| 11 | ALLOC 1 | 2019 | 2 | BUDGET | CC |
| 12 | ALLOC 1 | 2019 | | REFORECAST | CC |
| 13 | ALLOC 1 | 2020 | 3 | REFORECAST | CC |

*FIG. 10.*

| ALLOCATION INSTANCE | YEAR/TYPE/MONTH OF EVENT | ID | EXPLANATION |
|---|---|---|---|
| 2019 BUDGET | 2019/BUDGET/M1 | 10 | THE DEFAULT ALLOCATION: THIS 2019 BUDGET EVENT WAS GIVEN NO START MONTH. THIS OVERRIDES ANY BUDGET OR REFORECAST THAT MAY HAVE CARRIED OVER FROM THE PRIOR FISCAL PERIOD. |
| | 2019/BUDGET/M2 | 11 | MOST SPECIFIC USED: THIS IS A 2019 BUDGET EVENT THAT STARTS IN MONTH 2. |
| 2019 REFORECAST M2 | 2019/REFORECAST M2/M1 | 10 | THIS 2019 BUDGET EVENT WAS GIVEN NO START MONTH. THIS OVERRIDES ANY BUDGET OR REFORECAST EVENTS THAT MAY HAVE CARRIED OVER FROM THE PRIOR FISCAL PERIOD. THERE ARE NO REFORECAST M2 EVENTS TO OVERRIDE THIS EVENT, SO THE BUDGET IS USED. |
| | 2019/REFORECAST M2/M2 | 11 | MOST SPECIFIC USED: THIS IS A 2019 BUDGET EVENT THAT STARTS IN MONTH 2. THERE ARE NO REFORECAST M2 EVENTS TO OVERRIDE THIS EVENT, SO THE BUDGET EVENT IS USED. |
| 2019 REFORECAST | 2019/REFORECAST (ROLLING)/M1 | 10 | MOST SPECIFIC USED: THIS 2019 BUDGET EVENT WAS GIVEN NO START MONTH. THIS OVERRIDES ANY BUDGET OR REFORECAST EVENT THAT MAY HAVE CARRIED OVER FROM THE PRIOR FISCAL PERIOD. |
| | 2019/REFORECAST (ROLLING)/M2 | 11 | MOST SPECIFIC USED: THIS IS A 2019 BUDGET EVENT THAT STARTS IN MONTH 2. THERE ARE NO REFORECAST EVENTS TO OVERRIDE THIS EVENT, SO THE BUDGET EVENT IS USED. |
| | 2019/REFORECAST (ROLLING)/M3 | 12 | MOST SPECIFIC USED: THE ROLLING REFORECAST EVENT STARTS AFTER THE LAST NON-ROLLING EVENT. |
| 2020 BUDGET | 2020/BUDGET/M1 | 12 | THE DEFAULT ALLOCATION: THE PRIOR YEAR'S LAST EVENT IS INHERITED FOR THIS YEAR. |
| | 2020/BUDGET/M3 | 13 | FILLING IN THE GAPS: THE ROLLING REFORECAST EVENT IS USED IN THE BUDGET. |
| 2021 BUDGET | 2021/BUDGET/M1 | 13 | THE DEFAULT ALLOCATION: THE PRIOR YEAR'S LAST EVENT IS INHERITED FOR THIS YEAR. |

FIG. 12. (CONT.)

| WELCOME JOHN SMITH | | KARDIN ENTERPRISE SAAS | | COMPANY: PROPERTY MANAGEMENT SERVICES | | | | | | | | | | | LOGOUT |
|---|---|---|---|---|---|---|---|---|---|---|---|---|---|---|---|
| HOME | SETUP | COA | OUTLINES | ENTITIES | EXTERNAL ALLOCATION | REPORTS | | | | | | | | | |
| ENTITY SETUP | | WORKFLOW | DATA | VARIANCES | UDC | PAYROLL | | | | | | | | | |
| ENTITY INFO | | COST CENTERS | | ALLOCATIONS | EXTERNAL ALLOCATIONS | DATA KEYS | | | | | | | | | |
| ALLOCATION NAME: MYALLOCATIONNAME ▸ CORP BUDGET, MB1000 -- CORP/SHARED, ALLOCATION NAME, PAYROLL ⏮ ◂ 3 OF 127 ▸ ⏭ | | | | | | | | | | | | | | | |
| FISCAL YR: 2018 ▸ | | SHOW: ALL VALUES ▸ | | MAR19 | APR19 | MAY19 | JUN19 | JUL19 | AUG19 | SEP19 | OCT19 | NOV19 | DEC19 | JAN20 | FEB20 |
| +/- | COST CENTER ID ◉ | COST CENTER NAME ◉ | SUSPENDED | M1 | M2 | M3 | M4 | M5 | M6 | M7 | M8 | M9 | M10 | M11 | M12 |
| | bd-1110 | BLD1 | | 100% | 100% | 100% | 100% | 60% | 60% | 60% | 60% | 0% | 0% | 0% | 0% |
| | bd-1120 | BLD2 | | 0% | 0% | 0% | 0% | 20% | 20% | 0% | 0% | 0% | 0% | 0% | 0% |
| | bd-1130 | BLD3 | | 0% | 0% | 0% | 0% | 20% | 20% | 20% | 20% | 40% | 40% | 40% | 0% |
| | bd-1140 | BLD4 | | 0% | 0% | 0% | 0% | 0% | 0% | 0% | 0% | 60% | 60% | 60% | 100% |
| ⊗ | bd-1150 | BLD5 | | 100% | 100% | 100% | 100% | 100% | 100% | 80% | 80% | 100% | 100% | 100% | 100% |
| ⊞ | | | | | | | | | | | | | | | |
| TOTAL ACCOUNTS: 6 | | | | | | | | | | | | USED BY (15) ITEMS | | RESET | 100 CLOSE |
| IMPORT | EXPORT | | | | | | | | | | | | | | |

FIG. 13.

| | | | | | | | | | | | | | |
|---|---|---|---|---|---|---|---|---|---|---|---|---|---|
| WELCOME JOHN SMITH | | | KARDIN ENTERPRISE SAAS | | COMPANY: PROPERTY MANAGEMENT SERVICES | | | | | | | | LOGOUT |
| HOME | SETUP | COA | OUTLINES | ENTITIES | EXTERNAL ALLOCATION | REPORTS | | | | | | | |
| ENTITY SETUP | | WORKFLOW | DATA | VARIANCES | UDC | PAYROLL | | | | | | | |
| ENTITY INFO | | COST CENTERS | | ALLOCATIONS | EXTERNAL ALLOCATIONS | DATA KEYS | | | | | | | |
| ALLOCATION NAME: MYALLOCATIONNAME ⊙ | | | | | CORP BUDGET, MB1000 – CORP/SHARED, ALLOCATION NAME, PAYROLL | | | | | | | 3 OF 127 | |
| FISCAL YR: 2018 ⊙ | | SHOW: NON-ZERO VALUES ⊙ | | | | | | | | | | | |
| +/- | COST CENTER ID ⊙ | COST CENTER NAME ⊙ | SUSPENDED | MAR19 M1 | APR19 M2 | MAY19 M3 | JUN19 M4 | JUL19 M5 | AUG19 M6 | SEP19 M7 | OCT19 M8 | NOV19 M9 | DEC19 M10 | JAN20 M11 | FEB20 M12 |
| | bd-1110 | BLD1 | | 100% | 100% | 100% | 100% | 60% | 60% | 60% | 60% | | | | |
| | bd-1120 | BLD2 | | | | | | 20% | 20% | 20% | | | | | |
| | bd-1130 | BLD3 | | | | | | 20% | 20% | | 20% | 40% | 40% | 40% | |
| | bd-1140 | BLD4 | | | | | | | | | | 60% | 60% | 60% | 100% |
| ⊗ | bd-1150 | BLD5 | | 100% | 100% | 100% | 100% | 100% | 100% | 80% | 80% | 100% | 100% | 100% | 100% |
| ⊞ | | | | | | | | | | | | | | | |

TOTAL ACCOUNTS: 6

IMPORT | EXPORT

USED BY (15) ITEMS | RESET | CLOSE

FIG. 14.

WELCOME JOHN SMITH     KARDIN ENTERPRISE SAAS     COMPANY: PROPERTY MANAGEMENT SERVICES     LOGOUT

HOME | SETUP | COA | OUTLINES | ENTITIES | EXTERNAL ALLOCATION | REPORTS

ENTITY SETUP | WORKFLOW | DATA | VARIANCES | UDC | PAYROLL

ENTITY INFO | COST CENTERS | ALLOCATIONS | EXTERNAL ALLOCATIONS | DATA KEYS

ALLOCATION LIST – CORPORATE BUDGET – DEV1000 – SOFTWARE DEVELOPMENT PROJECTS     STATUS MODE: ACTIVE

⊕ ADD NEW ALLOCATION

| | VIEW | EDIT | NAME | TYPE/PLAN | PAYROLL | DESCRIPTION | ALLOC | ASSIGNED | COPY | DETAIL | STATUS |
|---|---|---|---|---|---|---|---|---|---|---|---|
| ☐ | VIEW | ✎ | JONES, TIM | CC, PERCENTAGE | YES | | 0.00% | ASSIGNED | COPY | REPORT | ACTIVE |
| ☐ | VIEW | ✎ | SMITH, JAN | DEPT, PERCENTAGE | YES | | 100.00% | ASSIGNED | COPY | REPORT | ACTIVE |
| ☐ | VIEW | ✎ | CONTINGENT STAFF | CC, PERCENTAGE | | COST PLUS 10% | 110.00% | ASSIGNED | COPY | REPORT | ACTIVE |
| ☐ | VIEW | ✎ | TELEPHONY SERVICE | CC, FIXED PRICE | | FIXED PRICE | 120.00% | ASSIGNED | COPY | REPORT | ACTIVE |
| ☐ | VIEW | ✎ | I.T. SUPPORT 5300 | CC, FIXED PRICE | | FIXED PRICE | 45.00% | ASSIGNED | COPY | REPORT | ACTIVE |
| ☐ | VIEW | ✎ | MGT OVERHEAD | CC, EQUALLY | YES | | 100.00% | ASSIGNED | COPY | REPORT | ACTIVE |
| ☐ | VIEW | ✎ | SNOW REMOVAL GRP 1 | CC, PERCENTAGE | | | 100.00% | ASSIGNED | COPY | REPORT | ACTIVE |
| ☐ | VIEW | ✎ | HVAC GRP 3 | CC, PERCENTAGE | | | 110.00% | ASSIGNED | COPY | REPORT | ACTIVE |

TOTAL ALLOCATIONS: 8     RECORDS PER PAGE 100

UPDATE SELECTED: --SELECT-- ▽

IMPORT | EXPORT

*FIG. 16.*

VARIABLE RESOURCE ALLOCATION

BACKGROUND

Resource management includes many tasks and budgeting is one of them. Budgeting includes the act of attempting to predict the future through one or more data models. Contained in these models are the different resources that are being managed, such as materials, equipment, manpower, and expenses, among others. In conventional systems, the approach is often simple. Resource credits and debits are simply assigned to parts of the data model. For example, in financial models, accounts are the predominant approach to managing accrual or cash based budgets. While this approach may work well for some situations, e.g., small budgets, such as those created as a home budget or for very small offices, it does not provide the organizational structure that many businesses need to do in-depth analysis. For example, it is not uncommon for an organization to have many different versions of a budget for different possible futures, to have budgets segmented by departments, by clients, by cost centers, by reporting codes, or other logical structures specific to their business needs. Of the conventional resource budgeting systems that support more data structures than just accounts, most require that the user allocate exactly 100% of each resource into their alternate data structure (e.g. cost center), that the allocation is static in nature (cannot change or be altered throughout the year), and that they are manually created and constrained to a specific period, such as the 2019 tax year. The static allocation is used in computations applied to each sub-period (month, week, day, etc.) within the financial period, which often does not provide an accurate picture because actual resource allocation will vary over the course of a year, such as a change to an employee's compensation, and so forth. Current systems generally do not allow allocations to be anything other than 100% and will report under or over allocations as an error. For example, if an employee's salary of $12,000 is allocated across multiple customers and the amount allocated doesn't add up to $12,000, it is considered an error. Throughout the rest of this document, the term budget will be used to represent a set of data models that are utilized to predict resource usage. To simplify the description of some embodiments of the invention, examples given will be related to financial resources, but the technology described herein also applies to other types of resources, such as materials used in manufacturing, among others.

With conventional systems, when a modification or revision to a model are needed, the allocation data for each sub-period (months, weeks, days) must be recreated. Because of the new models, additional data is added. Thus, successive modifications to a resource model over the course of a budget period results in an accumulation of copious amounts of data to be stored and maintained by the budget management system, which consumes additional computer resources and processing power. Further, the resultant large amount of data is difficult for a user to view and manage efficiently. For example, a company that updates its models monthly will have twelve times the data for each dimension of data that it builds at the end of a year. For example, if the company maintain three versions of a conventional static model—e.g., optimistic, pessimistic and realistic—they will have 36 times the data they would have with a single static model. When considering multiple years of data, and especially in systems that are multi-tenant in nature (applications where numerous companies share the same system), using conventional static allocations quickly becomes unusable unless limits are placed on the ability to support different versions of the data.

It would be beneficial for a resource budgeting system to provide the ability to create and save dynamic allocations, e.g., changes to an existing allocation, that are easily and efficiently created and allow changes over time, that could be applied to an existing allocation in a direct fashion, to maintain the data in an efficient manner that reduces the amount of data and computer resources required, and provide an interface that enables an immediate and efficient view of different aspects of a resource allocation data based on incremental revisions that have been applied to an allocation over time.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

An embodiment is directed toward systems, media, and methods for managing modifications to an allocation. Modifications to an allocation may be represented as deltas, and the deltas may be evaluated against a set of rules to determine a precedence for selectively applying the deltas. The deltas may be selectively applied to the allocation according to the precedence to generate an allocation instance, and the allocation instance may be adapted into a location of a user interface.

BRIEF DESCRIPTION OF THE DRAWINGS

Aspects of the invention are described in detail below with reference to the attached drawing figures, wherein:

FIG. 7 depicts an exemplary allocation based on equally spread, system-computed percentages;

FIG. 9 depicts an exemplary add allocation screen;

FIG. 10 depicts an exemplary detail table;

FIG. 13 depicts an exemplary management view of allocation data;

FIG. 14 depicts an exemplary management view of allocation data;

FIG. 16 depicts an exemplary allocation list interface;

DETAILED DESCRIPTION

Figure 1:
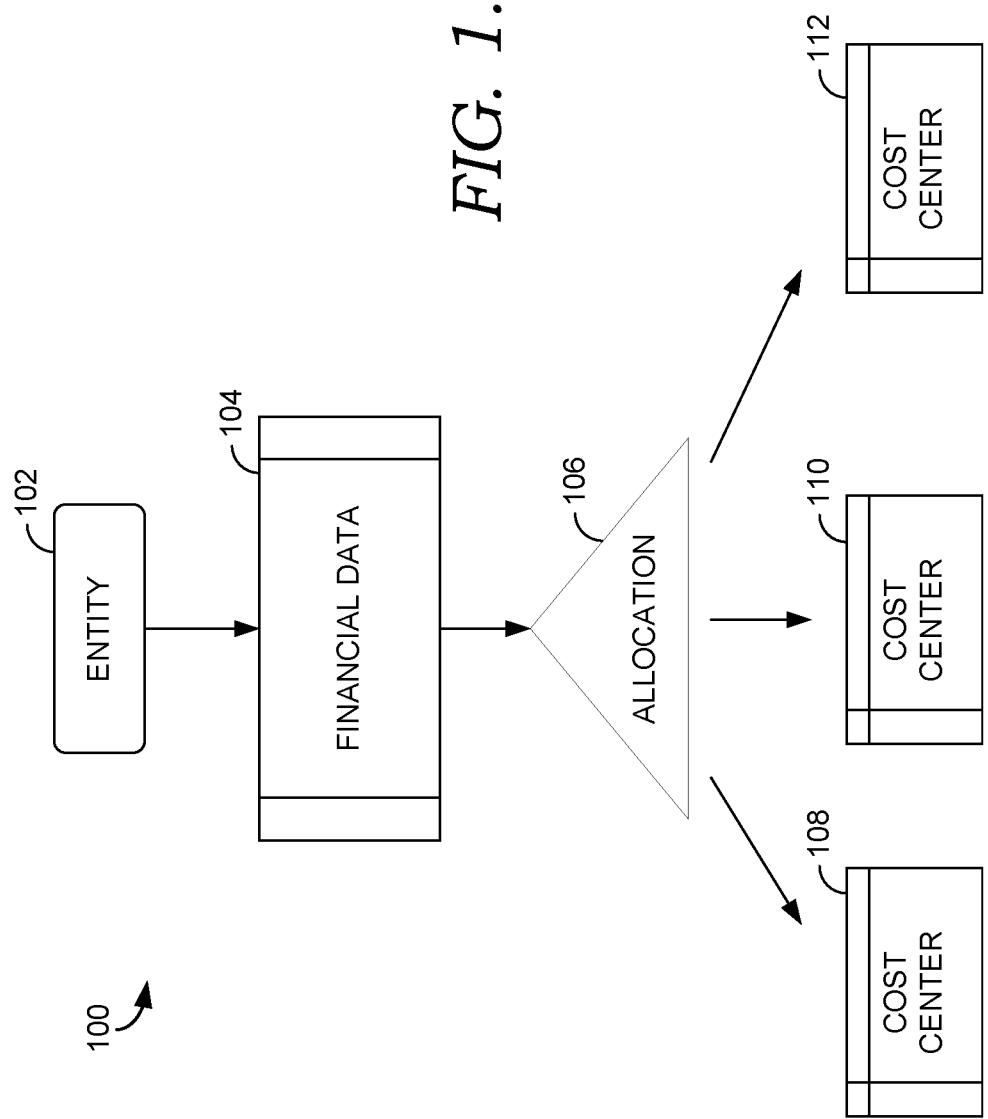
FIG. 1 is a diagram which illustrates an exemplary static cost center allocation.

The technology described herein generally provides methods and systems for managing modifications to an allocation. Modifications to an allocation may be represented as deltas, and the deltas may be evaluated against a set of rules to determine a precedence for selectively applying the deltas. The deltas may be selectively applied to the allocation according to the precedence to generate an allocation instance, and the allocation instance may be adapted into a location of a user interface.

In a first aspect, a method of managing modifications to an allocation includes generating a plurality of deltas to represent the modifications to the allocation. A precedence is determined for applying selective ones of the plurality of deltas based on one or more rules. The plurality of deltas is applied to the allocation according to the precedence to generate an allocation instance. The allocation instance is adapted into a predetermined location of a user interface.

In a second aspect, computer-storage media embody computer-usable instructions that implement a method of managing modifications to an allocation. The method includes generating a plurality of deltas to represent modifications to the allocation. Proceeding in a chronological order associated with the plurality of deltas, an allocation instance is generated by applying selective ones of the plurality of deltas to the allocation based on a precedence determined by one or more rules, comprising 1) applying two or more of the plurality of deltas in an order based on a comparison of a level of accuracy of revision data associated with each of the two or more of the plurality of deltas, and 2) for a given type of revision data, exclude one or more of the plurality of deltas from being applied to the allocation based on a comparison of lengths of overlapping starting periods of the plurality of deltas. The allocation instance is adapted into a predetermined location of a user interface.

In a third aspect, a system for managing modifications to an allocation includes one or more memory devices that store a database. The database stores a plurality of deltas generated to represent the modifications to the allocation. The system also includes one or more processors that 1) generate the plurality of deltas to represent the modifications to the allocation, 2) determine a precedence for applying selective ones of the plurality of deltas based on one or more rules, 3) apply the plurality of deltas to the allocation according to the precedence to generate an allocation instance, 4) adapt the allocation instance for presentation in a predetermined location of a computer-implemented user interface, and 5) communicate the adapted allocation instance to a user device for presentation in the computer-implemented interface.

An entity as used herein is a collection of resource data. Resource data can include data associated with materials, equipment, manpower, computing resources, employee compensation, expenses, projections, budgets, actuals, reforecasts, and so forth. The resource data in an entity may be organized in many ways, some of which are accounts, cost centers and departments. In the simplest of scenarios, conventional resource management systems simply assign resource data to accounts. That approach may work well for small budgets, such as those created as a home budget or for very small offices, but does not provide the insight into resource data that larger organizations need, which often includes being able to analyze resource data by many different dimensions, such as cost centers and departments. In some embodiments, resource data includes financial data. However, the technology described herein is not limited to financial data, but may be applied to dynamic allocation of various types of resources. Non-limiting examples of resources to which the technology may be applied include materials, equipment, manpower, computing resources, and so forth.

As used herein, a cost center is an organizational construct which can be further structured by other constructs, such as departments and accounts. Different types of enterprises may choose to apply cost centers in different ways. For example, a commercial property management company may use cost centers to represent the building they manage, while a property developer might use a cost center to represent each development project they have. A manufacturing company may use cost centers to represent factories at different locations, or departments within a factory.

Conventional resource management systems often do not include this "cost center" construct. Of those that do use cost centers, most require that the user assign 100% of each piece of financial data to a single cost center and do not support the concept of a system-computed allocation. Of those systems that support system-computed allocations, the allocations are statically defined. As used herein, an allocation is a template used to compute, account for, and organize resource data.

FIG. 1 depicts a high-level diagram showing a static cost center allocation for an entity, and is generally referred to as static allocation 100. Static allocation 100 is but one example of an allocation and is not intended to suggest any limitation as to the scope of use or functionality of the technology described herein. Neither should static allocation 100 be interpreted as having any dependency or requirement relating to any one or combination of components illustrated.

As depicted, an entity 102 includes a collection of resource data 104, which in this example is financial data 104. However, as described above, in other embodiments resource data 104 may reflect other types of resource data, and may be organized in different ways, including accounts, cost centers and departments. As depicted in FIG. 1, financial data 104 is organized into cost centers. As described above, an allocation is a template used to compute, account for and organize financial data. As depicted in FIG. 1, a static allocation 106 allocates portions of financial data 104 to three cost centers, e.g., cost center 108, cost center 110, and cost center 112.

As a specific example of a static allocation similar to allocation 100, a company may assign cost centers to projects associated with different clients. For example, a property management company may manage properties owned by separate clients, with each client's property considered as a separate cost center. For an employee that performs work associated with the different cost centers, such as building maintenance, the property management company may allocate different percentages of the employee's compensation (and/or expenses) for a budget period to each cost center. One example of such a static, user defined, fixed percentage allocation is depicted in Table 1. The cost centers Client 1 and Client 2 are each allocated 30% of Employee 1's compensation/expense, and the cost center for Client 3 is allocated 40% of Employee 1's compensation/expense.

TABLE 1

| Cost Center | Employee 1 |
| --- | --- |
| Client 1 | 30% |
| Client 2 | 30% |
| Client 3 | 40% |

Because the allocations are static, the percentage allotted to each cost center does not change for the entire budget period, which is usually a fiscal year. Although the allotments are static, the employee's compensation may not be. The allocation may be used to compute the correct financial data for each sub-period (month, week, day, etc.) within the financial period. Generally, allocations must add up to 100%, e.g., 30%+30%+40%=100%. Any piece of financial data not allocated exactly at 100% may conventionally be considered an error.

Because conventional budgeting systems use static allocations, making a change to an allocation requires entering a new allocation that is maintained independently from the original allocation. Thus, successive modifications to an allocation over the course of a budgeting period results in an accumulation of copious amounts of data to be stored and maintained by the resource management system, which consumes additional computer resources and processing power. Additionally, conventional systems do not recognize a relationship between the original allocation and the new, revised allocation. The resultant amount of data is time consuming to view and requires a user to search through large amounts of data and allocation records to identify a current state of resource allocations for a budget, or whatever information is important or sought by the user, even with the advantages afforded by the use of conventional database techniques and user interfaces to analyze such data.

An embodiment of the invention provides dynamic allocations, e.g., provides a user with the functionality to directly and efficiently create and save changes to an existing allocation, such as incremental revisions that occur over time, and which can be applied to an existing allocation in a direct fashion. In an embodiment, the manner in which this is accomplished enables the resource management system to maintain data associated with the allocation revisions in an efficient manner that reduces the amount of data and computer resources required, and to provide an improved user interface having the functionality to immediately and efficiently display different aspects of resource data based on the incremental revisions that have been applied to an allocation.

A number of terms used herein are as follows:

| | |
| --- | --- |
| Actuals | Actuals represent actual historical monthly data and may be pulled from a system that tracks historical data, such as an accounting system. Actuals may be loaded into the resource budgeting system and used with reforecasts. This type of data is different than budgeting data as it represents actual resource data. There can only be one instance of historical data for any given time. When combined with budgeting data, the system can compute the variances to help identify which budget models are more or less accurate. When combined with artificial intelligence, this is the information needed to train the AI to recognize the better budget models. |
| Allocation | An allocation is a way to take data from one organizational structure and automatically manage it in another organizational structure. For example, a line item in an account can be allocated into one or more cost centers. An even more specific example is the expense of an employee, something that shows up in a payroll account, that might be allocated across multiple cost centers, representing the work being done and the billing that the customers will receive in the future.<br>Allocations allow budgets to be analyzed in different dimensions or organizational constructs for more in-depth reporting purposes. Allocations are powerful modeling tools a company can use to account for resources in a way that is meaningful to the company. |
| Budget | Budget data is a set of data models that are used to estimate resources, such as income and expenses, among others, over some period and set of sub-periods, in advance of actual usage. For example, a fiscal budget may have models that predict a pessimistic, optimistic and realistic view of a company's finances 1 to 10 years in advance, broken down by years, and months within each year. This data be classified several ways, such as by accounts, cost centers, departments, versions, report codes, and so forth. Unlike accounting data, it is entirely valid, and expected to have multiple budgets that cover the same time. |
| Cost Center | A cost center is an organizational construct under an entity that allows financial data to be organized independently from the account that the financial data was created under. Cost centers are another dimension by which data can be analyzed.<br>For example, an entity may track all the income and expense for all of a company's buildings. Under that entity, a cost center may be created for each building and income and expenses allocated per building via the cost centers. In an embodiment, a cost center is unique under an entity and has a unique cost center id and name within that entity. |
| Default Allocation | For each organization construct (cost center, account, department, and so forth) there exists a default allocation where 100% of the amount will be assigned to the organizational construct. In an embodiment, default allocations are created and maintained by the system. This default makes it easy to assign data from one model, such as an account, into a different model, such as a cost center, without requiring the user to do anything extra for the simple scenarios. |

-continued

| | |
|---|---|
| External Allocation | An external allocation is an entity-to-entity allocation which allows data to be passed between high level organizational constructs.<br>External allocations can be a very powerful tool allowing a company to have very detailed data present in one entity that they pass on to another entity as just a value. One example is how employee compensation may need to be accounted for. At a corporate level, there may need to be a high degree of detail. However, that detail may need to be hidden from regional staff so just the sum may passed to the regional entity via an external allocation.<br>Since each entity can have different data models, this allows for data transformations and mapping that would not be possible within a single entity. For example, one entity may use one set of cost centers and the second entity may use a completely different set of cost centers. The first may be organized by owners, and the second may be organized by managers, for example.<br>Different entities may also map to different fiscal calendars. One entity might begin its fiscal year in January while the second might be in June. |
| Fiscal year | A year as reckoned for taxing or accounting purposes. A fiscal year may start on any month. When that month is January, then the fiscal year may be called the calendar year.<br>In a situation where the fiscal year does not start in January, a company may need to have two views of their budget, one that aligns with the fiscal year and one that aligns with the calendar year.<br>There may be situations in which budget data in one entity has a different fiscal year than data from a different entity, and both are needed on one report. In this case, a user may specify the fiscal year, and data from both entities are mapped into the user-defined fiscal year.<br>A fiscal year may have 12 months (M1 through M12). These can be mapped to a calendar year and month. For example, M1 might map to 2019 March. |
| Flip Sign | In some scenarios, data that is entered may have the correct sign. For example, a contra value for an income that is over allocation would be negative.<br>Source value $1000 = over allocated value $1100 + contra value (−$100)<br>However, if that contra value was directed to something used to track expenses, the sign would need to be flipped to obtain the correct financial numbers.<br>Source value $1000 = over allocated value $1100 − contra value (+$100) |
| Markup | A user-specified multiplier that can be used to adjust an allocation plan. When markups are allowed, the allocation must define the over and under allocation information. |
| Over Allocation | An over allocation is an allocation that accounts for more than 100% of the input value.<br>For every over allocation, there needs to be a contra value that is used to "zero out" any over allocated portion. Failing to do this would result in data that fails during an audit. |
| Projection | This is similar to budget and reforecast data, but a projection may not be broken down into sets of monthly data. Projections may typically be more forward looking, e.g., 5 years into the future, and may be educated guesses often based on historical data. |
| Reforecast | One or more months of prediction that may be based on prior actuals. A reforecast may take several forms. Each form may be based on budget data and actual data. Forms that a reforecast can take may include: |
| | Rolling Reforecast — Allows users to keep updating a single reforecast with the latest information. A user may snapshot different time-period-specific versions to capture historical data if desired. |
| | M0, M1, ... M11 — Reforecasts of this form may be captured at a monthly resolution level. The month designator indicates how many months of actuals data exists. M0 is a special case that doesn't include any actuals but may include adjustments to a budget that are needed to better forecast the upcoming financial period. An example of this could be something like a rate change for electricity. An electricity bill may not yet have been received, but an increase or decrease in the rate will impact the budget. |
| | Q0, Q1, Q2, Q3 — Reforecasts of this form may be captured at a quarterly resolution level. Q0 is similar to M0. Q1 and M3, Q2 and M6, Q3 and M9 are all for the same time period but are separate reforecasts. In other words you can have an M3 and Q1 reforecast for the same budget. |
| | H0, H1 — Reforecasts of this form may be captured at a semi-annual (6 months) resolution level. H0 is similar to M0. |
| Under Allocation | An allocation that accounts for less than 100% of the input value.<br>For every under allocation, a contra value may be used to "zero out" any under allocated portion. Failing to do this will result in data that fails during an audit. |
| Year/Type | In an embodiment, this is a term that helps identify which data model will be used from a budget cycle. For example, for a budget for 2019, the year/type would be 2019 Budget.<br>In an embodiment, the year type is only unique within a budget cycle. For example, there could be multiple '2021 Budgets' under a company where they have budget cycles: '2018-2023', '2019-2024', '2020-2025' and '2021-2026'. In this case, there would be four 2021 Budgets. |

Figure 2:
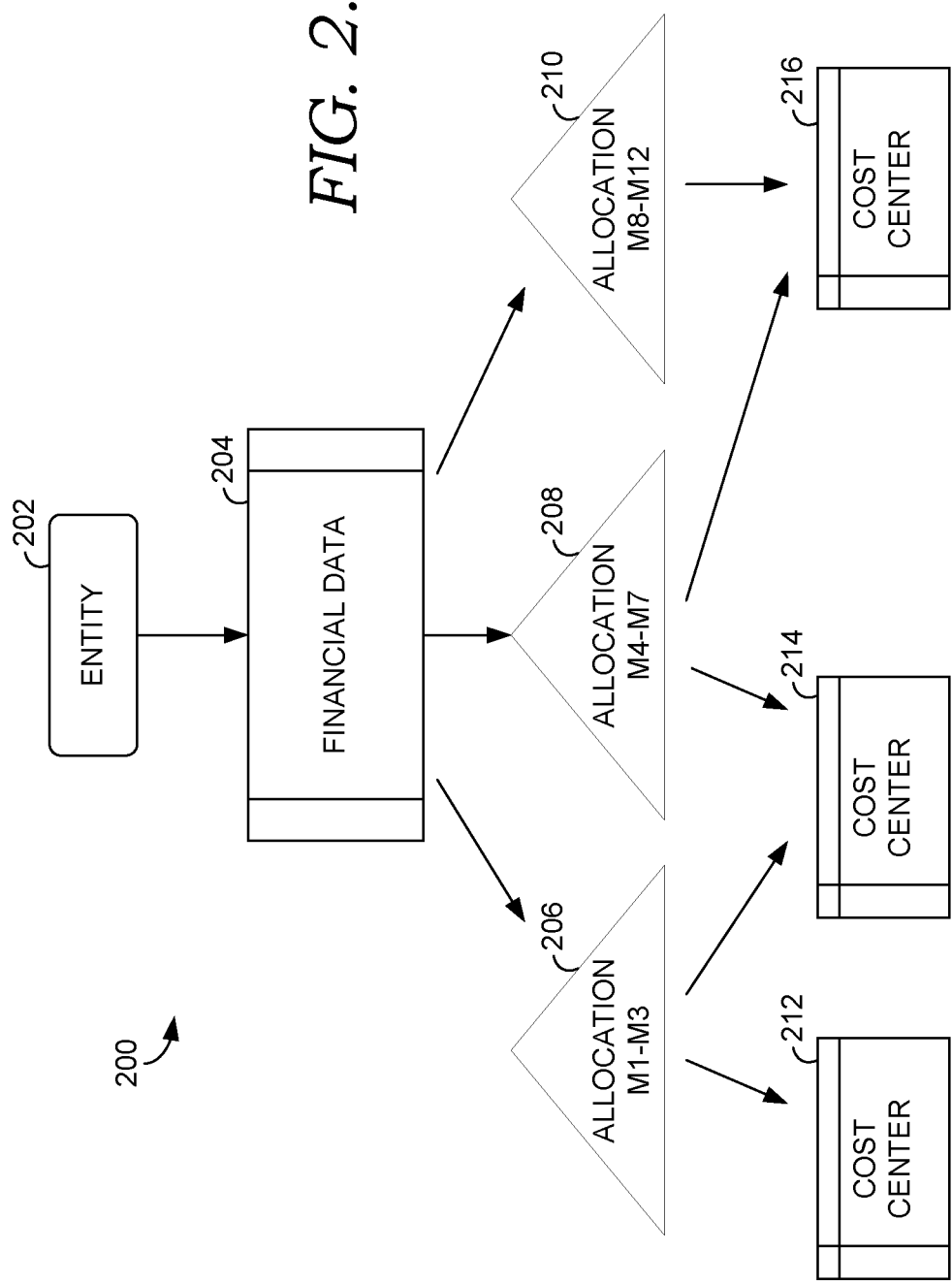
FIG. 2 is a diagram which illustrates an exemplary dynamic cost center allocation.

An embodiment of the technology described herein enables allocations to be organized and modified as a function of time, incorporating revisions to the allocation within a budget period. FIG. 2 depicts a high-level diagram suitable for use with an embodiment of the invention, showing how dynamic allocations may be used to modify how financial data is organized as a function of time, suitable for use with an embodiment of the invention, and is generally referred to as allocation 200. Allocation 200 is but one example of an allocation and is not intended to suggest any limitation as to the scope of use or functionality of the technology described herein. Neither should allocation 200 be interpreted as having any dependency or requirement relating to any one or combination of components illustrated.

As depicted, an entity 202 includes a collection of resource data 204, which in this example is financial data 204. However, in other embodiments of the invention, resource data 204 may reflect types of resource data other than of financial data. In general, resource data can include budgets, actuals, projections, reforecasts and other types of information, and may be organized in different ways, including accounts, cost centers and departments. As depicted in FIG. 2, financial data 204 is dynamically organized into cost centers, e.g., dynamic allocations 206, 208, and 210 allocate portions of financial data 204 to three cost centers, e.g., cost center 212, cost center 214, and cost center 216, in different ways as a function of time over a budget period, in this case, 12 months. For example, allocation 206 allocates portions of financial data 204 to cost centers 212 and 214 for month 1 through month 3 of the budget period; allocation 208 allocates portions of the financial data to cost center 214 and 216 for month 4 through month 7; allocation 210 allocates portions of the financial data to cost center 216 for month 8 through month 12. In this way, an allocation is represented as a function of time by defining sub-periods (e.g., months) within the budget period.

This approach both enables an allocation to be defined in terms of planned changes over time, and also accommodates other changes that may occur during the budget period. However, the initial allocation need not specify changes to the allocation in advance, e.g., the initial allocation may simply allocate resources for the entire fiscal period with no changes from one sub-period to the next, but still accommodate change that occurs during the budget period. For example, a property management company may manage properties owned by separate clients, with each client's property considered as a separate cost center and allocate different percentages of an employee's compensation (and/or expenses) for a budget period to each cost center, as depicted in Table 1 above, such that the cost centers Client 1 and Client 2 are each allocated 30% of Employee 1's compensation/expense, and the cost center for Client 3 is allocated 40% of Employee 1's compensation/expense. Then, in month 6 of the budget period, a new client/cost center may be added, and the allocation may be revised, for example, as shown in Table 2.

TABLE 2

| Cost Center | Employee 1 |
|---|---|
| Client 1 | 25% |
| Client 2 | 25% |
| Client 4 | 30% |
| Client 4 | 20% |

The allocations depicted in Table 1 and Table 2 add up to 100%. In an embodiment, allocated amounts are not required to sum to 100%, and contra accounts may be used to track journal entries needed to audit adjustments. In an embodiment, a system implementing dynamic allocations allows a user to enter allocations that do not sum to 100%, and the offset amounts required to total 100% are computed automatically. In one embodiment, users can select whether or not over and under allocations are allowed, and if so, how the over and under allocation amounts are represented in their budgets. If an income/expense is not allocated at 100%, the user may identify where the over or under allocation should be recorded and if there needs to be a sign flip, which may be needed to correctly account for the extra amount.

Allocations may be defined in different ways, which include types of allocation plans based on user defined percentages, equally spread (e.g., system computed) percentages, fixed amounts, user defined calculations, or other approaches such as artificial intelligence (AI) prediction models. In each type of allocation plan, allocations may need to vary over time based on changes made to the allocations in response to changing needs. Changes may impact the number of cost centers, the amounts allocated to cost centers, and contra amounts allocated to cost centers that are allocated at over or under 100%.

The following calculations may be applied for all types of allocation plans.

Let:

$\forall i \in \{1, \ldots, m\}$; where '$m$'; where '$m$' is the number of $sub$-periods (months, days, weeks, etc.) in the financial period;

$\forall g \in \{1, \ldots, q\}$; where '$q$' is the number of elements of 'data assigned the allocation' for $a$ given month ($i$);

$\forall j \in \{1, \ldots, n\}$; where '$n$' is the number of 'allocation targets' (cost centers, departments, etc.) for $a$ given month ($i$).

Then:

financial data($i$)=$\Sigma_{i,g}$ data assigned to allocation($i,g$).

Figure 3:
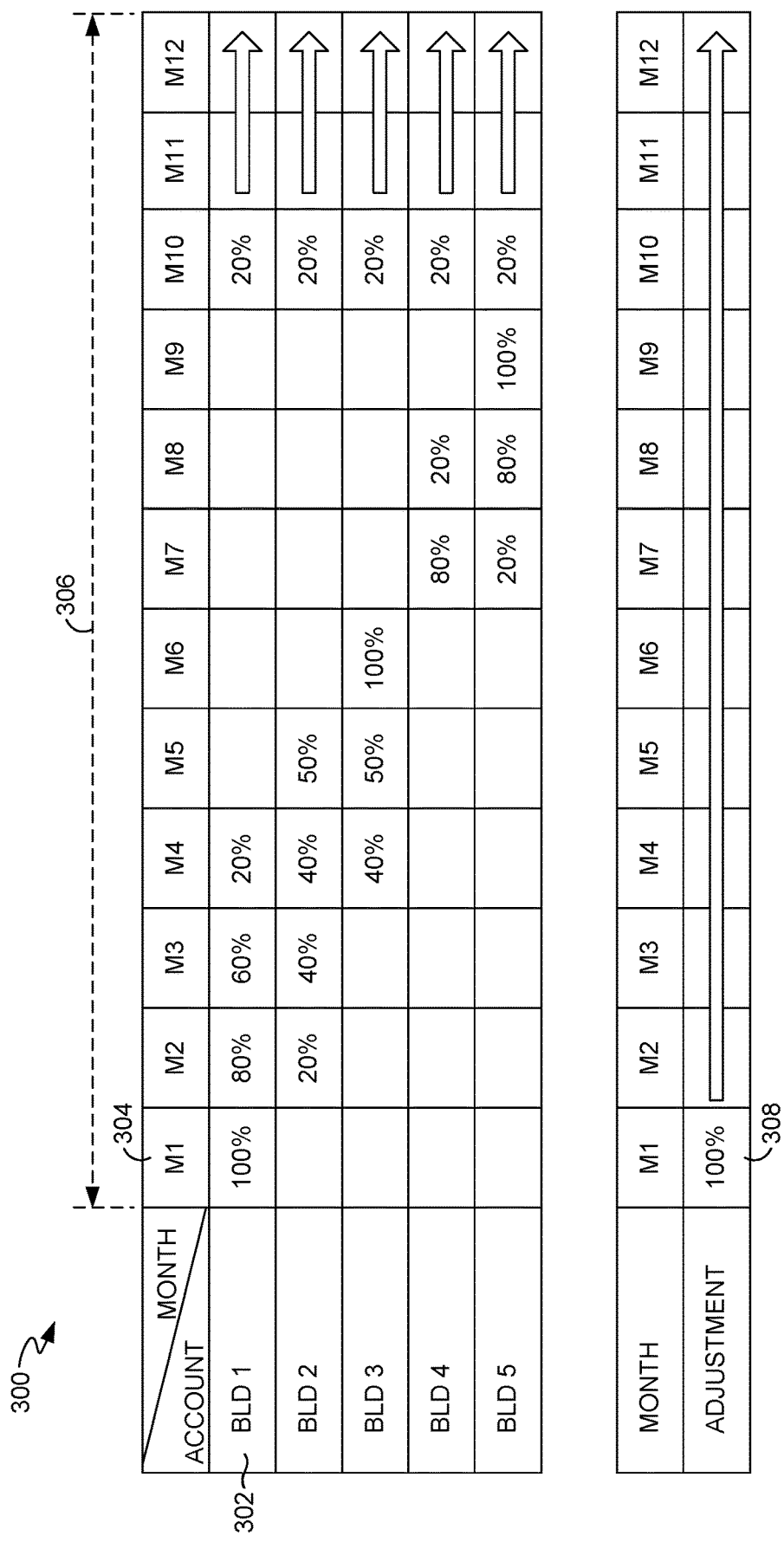
FIG. 3 depicts an exemplary allocation based on user-defined percentages.

The allocation used below is calculated based on the allocation plan selected by the user.

total allocated($i$)=$\Sigma_{i,j}$ allocation($i,j$);

over allocation($i$)=(−1*user negation)*(total allocated ($i$)−financial data($i$)), where financial data($i$)<total allocated($i$);

under allocation($i$)=(user negation)*(financial data ($i$)−total allocated($i$)), where financial data($i$)>total allocated($i$);

FIG. 3 depicts an exemplary allocation based on user-defined percentages, suitable for use with an embodiment of the invention, and is generally referred to as allocation 300. Allocation 300 is but one example of an allocation based on user-defined percentages, and is not intended to suggest any limitation as to the scope of use or functionality of the technology described herein. Neither should allocation 300 be interpreted as having any dependency or requirement relating to any one or combination of components illustrated.

FIG. 3 represents allocations for retrofitting 5 buildings over the first 3 quarters (M1 through M9) of the budget period, then performing routine maintenance across all 5 buildings for the remainder of the year (M10 through M12), which is one type of allocation plan that might be developed by an enterprise when planning a budget. For the allocation plan depicted in allocation 300, the user specifies what percentage of the financial data is allocated to which cost center. The "account" column identifies cost centers 302 (e.g., buildings BLD 1 through BLD 5). The "month" row identifies sub-periods 304 (e.g., months M1 through M12) within an overall budget period 306. For each sub-period, a percentage allocation allotted to each cost center is depicted. Allocations such as this may vary over time based on changes to the number of cost centers and the percentage allocated to each cost center. In an embodiment, the user can specify an overall adjustment percentage 308 that can be used to create an over or under allocation (mark up or mark down), for each period. As depicted in FIG. 3, the adjustment percentage 308 is specified as 100% (no mark up or mark down). One example of using the mark up is how a company may decide to charge its clients. Assume it charges a 35% fee over its burdened costs for its employees. If the employee's costs and burdens were directly allocated to the client, the cost for the employees would not include the 35% mark up. By simply using a 135% adjustment, the client price would be captured. The 35% difference would be recorded as a contra value in the data model. In this case, since it was income, the sign would most likely be flipped to positive and the difference would be assigned to a section of the budget for income.

Computations that may be performed for this allocation include:

$$allocation(i,j) = (financial\ data(i) * user\ defined\ percentage(i,j)) * adjustment\ percentage(i)$$

To build the allocation represented in FIG. 3 using conventional static allocations, the following calculations would be performed:

12 months at 100%=1200%

Project 1=100%+80%+60%+20%+20%+20%+20%=320%/1200%=26.7%

Project 2=20%+40%+40%+50%+20%+20%+20%=210%/1200%=17.5%

Project 3=40%+50%+100%+20%+20%+20%=250%/1200%=20.8%

Project 4=80%+20+20%+20%+20%=160%/1200%=13.3%

Project 5=20%+80%+100%+20%+20%+20%=260%/1200%=21.7%

Figure 4:
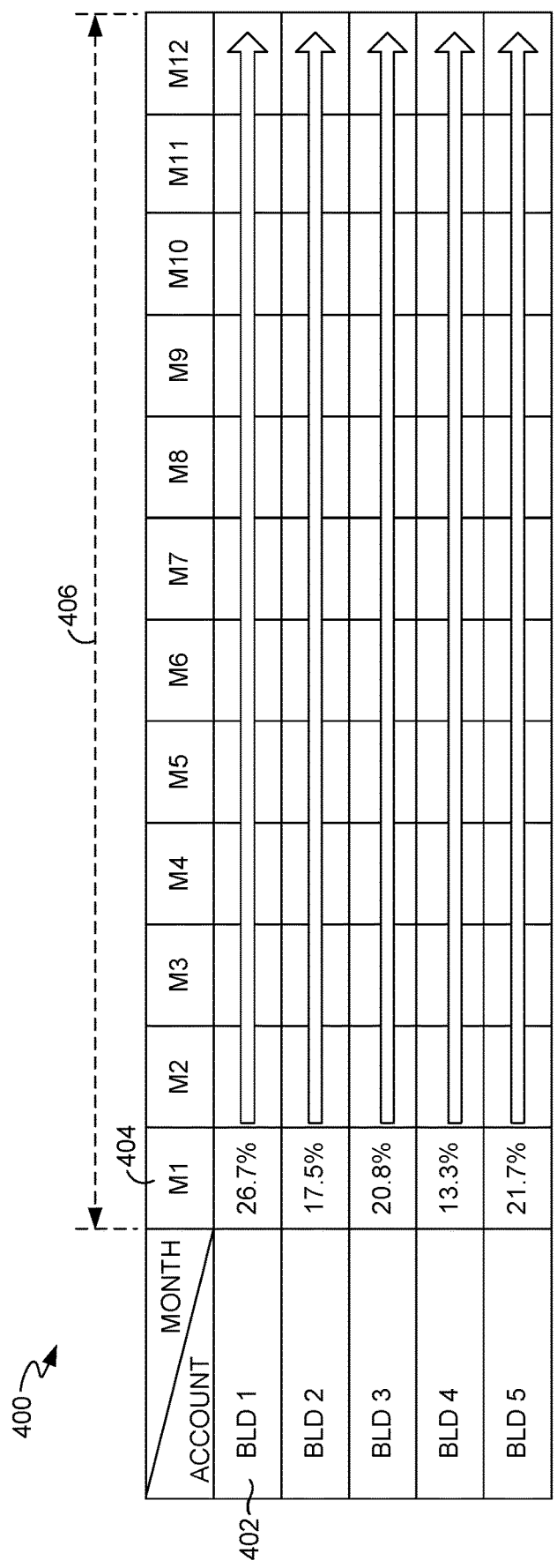
FIG. 4 depicts an exemplary static allocation.

The resultant static allocation, as might be determined in a conventional resource management system, is represented in FIG. 4. FIG. 4 depicts an exemplary static allocation and is generally referred to as static allocation 400. Static allocation 400 is but one example of an allocation based on user-defined percentages, and is not intended to suggest any limitation as to the scope of use or functionality of the technology described herein. Neither should static allocation 400 be interpreted as having any dependency or requirement relating to any one or combination of components illustrated.

As depicted in FIG. 4, the "account" column identifies cost centers 402 (e.g., buildings BLD 1 through BLD 5). The "month" row identifies sub-periods 404 (e.g., months M1 through M12) within an overall budget period 406. As described above, static allocations are conventionally assigned to an entire budget period, for example, a calendar year or a fiscal year. As depicted in FIG. 4, the allocations for retrofitting 5 buildings over the first 3 quarters, then performing routine maintenance across all 5 buildings for the remainder of the year, are shown as a single allocation per project for the entire budget period. Although in practice the allocations vary over time based on changes to the number of cost centers and the percentage allocated to each cost center, conventional static allocations do not reflect such changes that occur during the overall budget period. As described more fully below, an embodiment of the invention enables an allocation plan such as depicted in allocation 300 of FIG. 3 to be maintained as an allocation that varies over time, unlike conventional static allocation 400.

Figure 5:
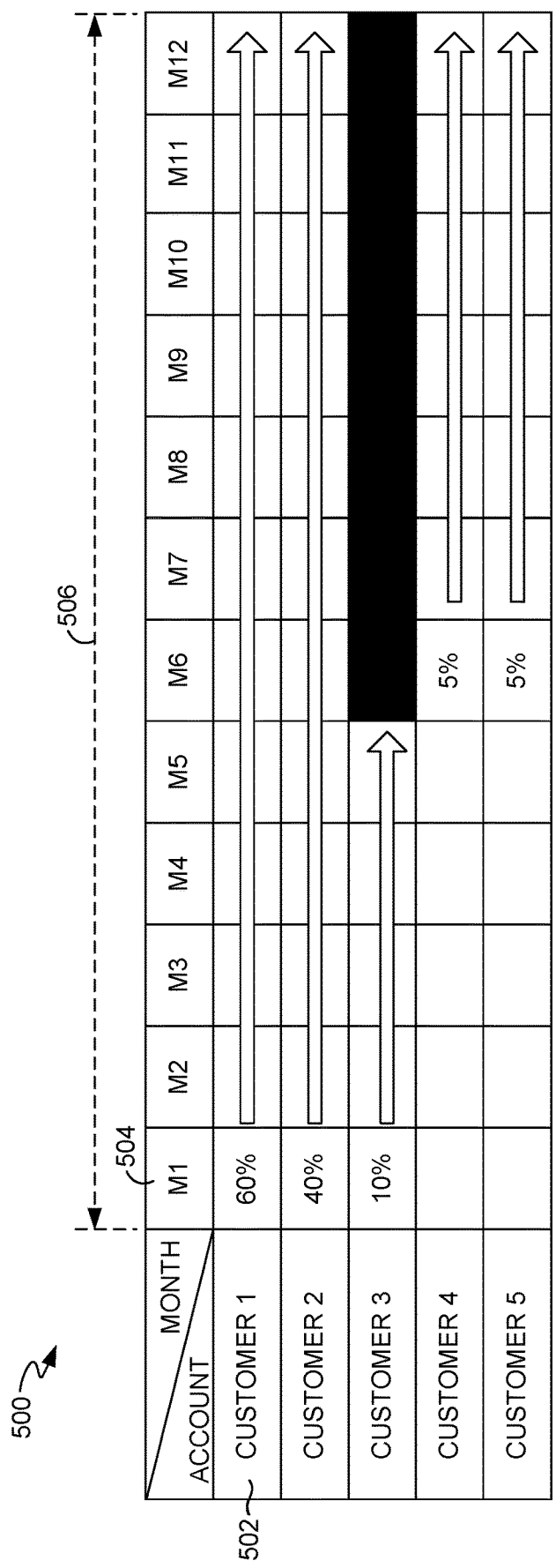
FIG. 5 depicts an exemplary allocation based on user-defined percentages.

FIG. 5 depicts another example of an allocation based on user-defined percentages, suitable for use with an embodiment of the invention, and is generally referred to as allocation 500. Allocation 500 is but one example of an allocation based on user-defined percentages, and is not intended to suggest any limitation as to the scope of use or functionality of the technology described herein. Neither should allocation 500 be interpreted as having any dependency or requirement relating to any one or combination of components illustrated.

Allocation 500 differs from allocation 300 in that allocation 500 reflects a reactive change that occurs during the allocation period, as described below. As depicted in FIG. 5, the "account" column identifies cost centers 502 (e.g., customers 1 through 5). The "month" row identifies sub-periods 504 (e.g., months M1 through M12) within an overall budget period 506. FIG. 5 represents an allocation of an employee (e.g., the employee's time, compensation, or expenses, and so forth) to individual customers. Unlike FIG. 3, which represents planned allocation changes, FIG. 5 represents reactive allocation changes that are needed due to the loss of a customer beginning in month 6. Initially, the employee was allocated to customers 1, 2, and 3, at 60%, 40%, and 10%, respectively. In month 6, when customer 3 was lost, that portion of the employee's allocation was allocated to customers 4 and 5 at 5% for each.

To build the allocation represented in FIG. 5 using conventional static allocations, the following calculations would be performed:

Customer 1=60%*12=720%/1200%=60%

Customer 2=40%*12=480%/1200%=40%

Customer 3=10%*5=50%/1200%=4.2%

Customer 4=5%*7=35%/1200%=2.9%

Customer 5=5%*7=35%/1200%=2.9%

Figure 6:
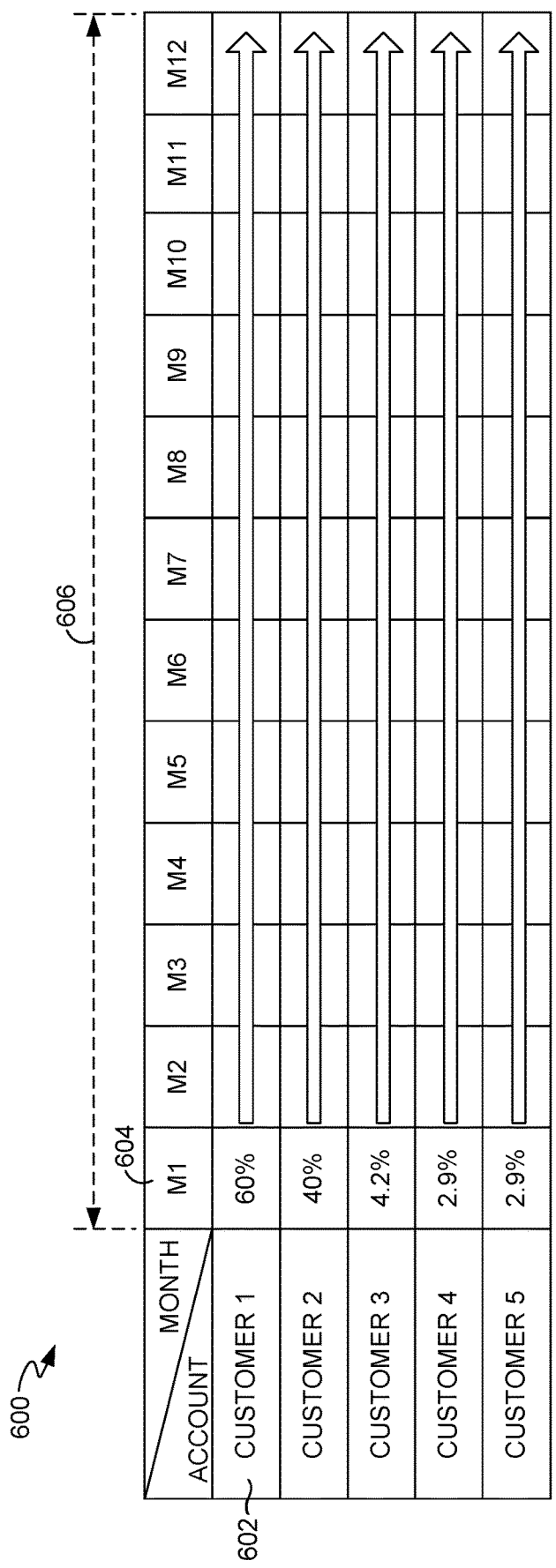
FIG. 6 depicts an exemplary static allocation.

The resultant conventional static allocation is represented in FIG. 6. FIG. 6 depicts an exemplary static allocation, and is generally referred to as static allocation 600. Static allocation 600 is but one example of an allocation based on user-defined percentages, and is not intended to suggest any limitation as to the scope of use or functionality of the technology described herein. Neither should static allocation 600 be interpreted as having any dependency or requirement relating to any one or combination of components illustrated.

As depicted in FIG. 6, the "account" column identifies cost centers 602 (e.g., customers 1 through 5). The "month" row identifies sub-periods 604 (e.g., months M1 through M12) within an overall budget period 606. As described above, static allocations are conventionally assigned to an entire budget period, for example, a calendar year or a fiscal year. As depicted in FIG. 6, the allocation representing the result of the loss of customer 5 and the reallocation of the employee to customers 4 and 5 is shown as a single allocation per project for the entire budget period. Although in practice the allocation was changed reactively during the budget period, the conventional resultant static allocation does not reflect the changes that occurred, but only the result as spread out over the overall budget period. As described more fully below, an embodiment of the invention provides a functionality that enables a reactive allocation such as allocation 500 in FIG. 5 to be dynamically adjusted during the allocation period, unlike the conventional static allocation 600.

FIG. 7 depicts an example of an allocation based on equally spread, system-computed percentages, suitable for use with an embodiment of the invention, and is generally referred to as allocation 700. Allocation 700 is but one example of an allocation based on system-computed percentages, and is not intended to suggest any limitation as to the scope of use or functionality of the technology described herein. Neither should allocation 700 be interpreted as having any dependency or requirement relating to any one or combination of components illustrated.

FIG. 7 represents a system-computed allocation of administrative staff equally across all projects, with an adjustment percentage of 100% (no mark up or mark down). With this allocation plan, the user specifies which cost centers to spread the financial data over and the system computes what the percentages need to be. The "project" column identifies cost centers 702 (e.g., projects PROJ1 through PROJ5). The "month" row identifies sub-periods 704 (e.g., months M1 through M12) within an overall budget period 706. For each sub-period, an "X" indicates a corresponding cost center selected by the user to receive an allocation for that sub-period. Allocations such as this may vary over time based on changes to the number of cost centers, the percentage allocated and the computed allocation percentages. In an embodiment, the user can specify an overall adjustment percentage 708 that can be used to create an over or under allocation (mark up or mark down) for each period. As depicted in FIG. 7, the adjustment percentage 708 is specified as 100%.

Computations that may be performed for this allocation include:

$$\text{participant count}(i) = \sum_{i,j} 1,$$

where allocation target $(i, j)$ is participating computed amount $(i) =$ (financial data $(i)$ / participant count $(i)$) ∗ adjustment percentage$(i)$ allocation$(i, j)$ = computed amount $(i)$ Conventional resource management systems do not provide a system-computed allocation such as is depicted in FIG. 7.

Figure 8:
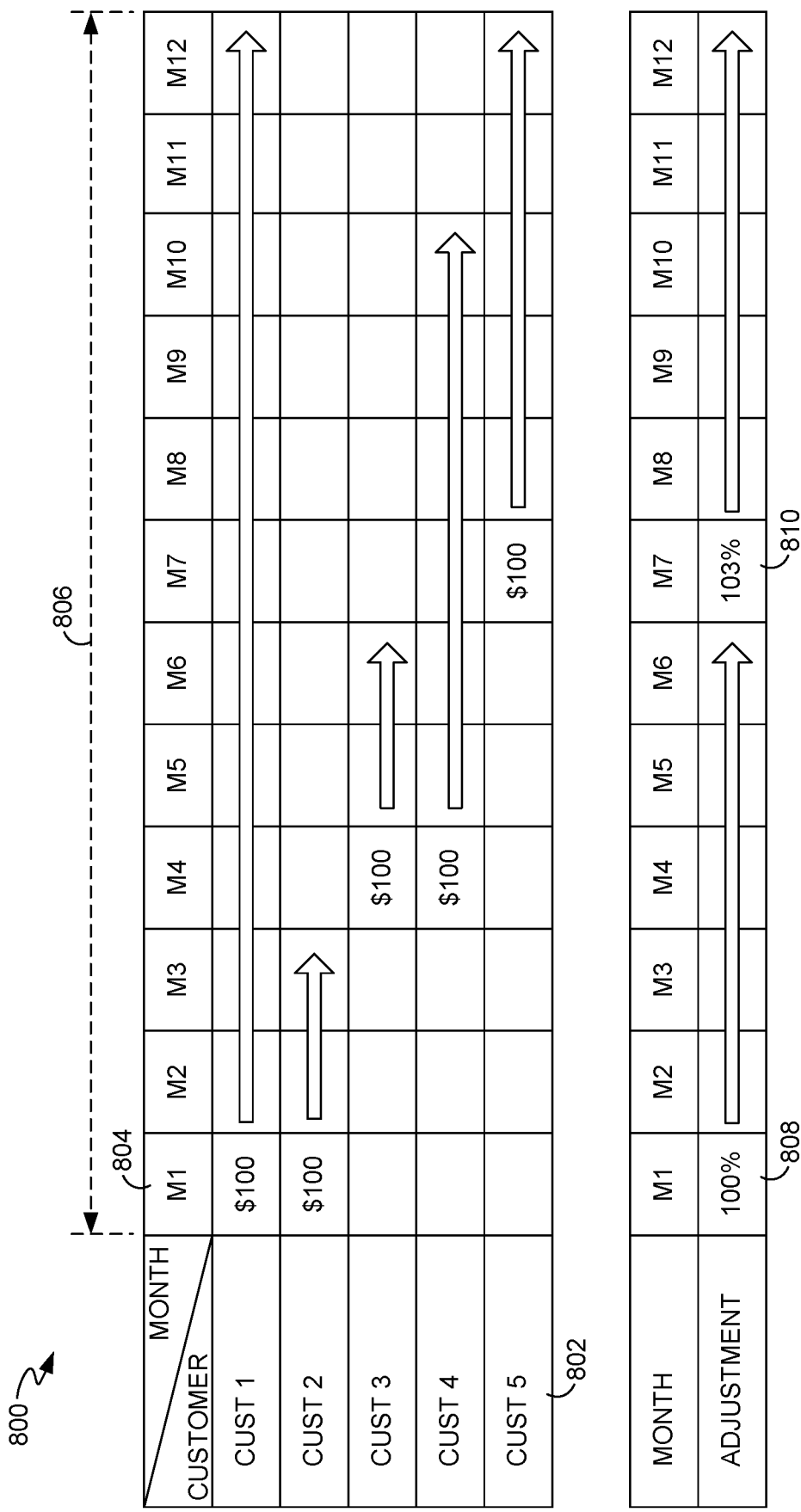
FIG. 8 depicts an exemplary allocation based on fixed amounts.

FIG. 8 depicts an example of an allocation based on fixed amounts, suitable for use with an embodiment of the invention, and is generally referred to as allocation 800. Allocation 800 is but one example of an allocation based on fixed amounts, and is not intended to suggest any limitation as to the scope of use or functionality of the technology described herein. Neither should allocation 800 be interpreted as having any dependency or requirement relating to any one or combination of components illustrated.

With this type of allocation plan, the user specifies a specific amount for each allocation and the system computes the contra entries, if needed, to account for any under or over allocation. The "customer" column identifies cost centers 802 (e.g., customers CUST 1 through CUST 5). The "month" row identifies sub-periods 804 (e.g., months M1 through M12) within an overall budget period 806. For each sub-period, a fixed dollar amount allotted to each cost center is depicted.

FIG. 8 represents an example in which an executive's consulting services are allocated for a fixed price per month, with an initial adjustment percentage 808 of 100% in month 1, and a later adjustment percentage 810 of 103% in month 7. Allocations such as this may vary over time based on changes to the number of cost centers and the specified amount of allocation to each. Although this type of allocation could be used for multiple sets of financial data, a more typical application would be for a situation in which there is one set of financial data per allocation. Computations that may be performed for this allocation include:

$$\text{allocation}(i,j) = \text{user defined amount}(i,j) * \text{adjustment percentage}(i)$$

An embodiment of the technology described herein enables a user to vary allocations over time during a budget period, including both anticipated variations and reactive variations, based on changes made within one or more sub-periods of the budget period. An embodiment further provides an improved user interface including efficient means for both entering allocation revisions and viewing the result of the revisions throughout the budget period. Further, an embodiment enables multiple revisions to be associated with a single allocation, such that a user can selectively view the impact of different revisions with reference to the single allocation.

As described above, conventional resource management systems do not enable incremental changes to be made to a given allocation, but rather a revision to an allocation is created and stored as a separate allocation, and conventional systems do not recognize a relationship between the original allocation and the new, revised allocation. In an embodiment of the technology described herein, allocation revisions are recognized as revisions to a particular allocation, and a user may select the particular allocation and generate a report showing the result of applying all or a portion of the revisions to the selected allocation at different time periods.

In an embodiment, an allocation is created by way of an "add allocation" screen within a user interface, which enables a user to enter an allocation name, an allocation type, an allocation plan, whether markups are allowed, whether over allocations are allowed, whether under allocations are allowed, and a description of the allocation. In some embodiments, an allocation is created by way of importing the data or having the system create the data (AI). Each created allocation is stored in a database. In an embodiment, created allocations are stored in respective records of an allocation table including the information entered into the new allocation screen for each allocation. Revisions to an allocation may be entered via an edit allocation screen. In an embodiment, revisions to an allocation are stored in a detail table. Thus, for example, the detail table may contain multiple revisions to a single allocation stored in the allocation table. In this way, computer memory is used more efficiently because, unlike conventional resource management systems, storing an allocation revision does not require storing a complete set of data associated with an allocation (e.g., storing a new allocation reflecting the revision). Only the delta, e.g., the change to the allocation, needs to be stored in the detail table.

FIG. 9 depicts an exemplary add allocation screen, suitable for use with an embodiment of the invention, and is generally referred to as add allocation screen 900. Add allocation screen 900 is but one example of an add allocation screen, and is not intended to suggest any limitation as to the scope of use or functionality of the technology described herein. Neither should add allocation screen 900 be interpreted as having any dependency or requirement relating to any one or combination of components illustrated.

As depicted in FIG. 9, various entry fields allow a user to provide information about a new allocation to be added to the system. An allocation name field 902 is configured to receive a user-supplied name for a new allocation. In an embodiment, allocation name field 902 is a text entry field.

An allocation type field 904 is configured to receive a user selection of an allocation type. In an embodiment, an allocation type may be selected from a plurality of predefined allocation types, and the allocation type field 904 may be a drop-down list or other type of input field that provides selectable alternatives, such as a list box, scrollable menu, and so forth. Exemplary allocation types may include, but are not limited to, cost center and department.

An allocation plan field 906 is configured to receive a user selection of an allocation plan. In an embodiment, an allocation plan may be selected from a plurality of allocation plans, and the allocation plan field 906 may be a drop-down list or other type of input field, such as a list box, scrollable menu, and so forth. Exemplary allocation types may include, but are not limited to, user-specified percentages, equally spread (e.g., system computed), user defined calculations, AI predicted, and fixed amount.

Resources may have user attributed tags, such as "payroll." These tags may be used to customize reports, segment the data, and control access. As depicted in FIG. 9, a payroll field 908 is configured to receive a user selection indicating whether the new allocation plan is a payroll allocation. The payroll attribute may be used to control in which reports the data appears, and which users have permission to view the resultant data. In an embodiment, payroll field 908 is configured as a checkbox. In some embodiments, payroll field 908 may be configured as other types of controls providing a toggleable input or selection indicating a true or false condition, and so forth.

A markups field 910 is configured to receive a user selection indicating whether markups are allowed for the new allocation plan. In an embodiment, markups field 910 is configured as a checkbox. In some embodiments, markups field 910 may be configured as other types of controls providing a toggleable input or selection indicating a true or false condition, and so forth. The resource model may contain markup templates that allow the user to use predefined mark up amounts and contra allocations. Any time mark ups are used, contra allocations are required.

An allow over allocations field 912 is configured to receive a user selection indicating whether over allocations are allowed for the new allocation plan. In an embodiment, allow over allocations field 912 is configured as a checkbox. In some embodiments, allow over allocations field 912 may be configured as other types of controls providing a toggleable input or selection indicating a true or false condition, and so forth.

A warn field 914 is configured to receive a user selection indicating whether a warning should be displayed to the user when an over allocation occurs. In an embodiment, warn field 914 is configured as a checkbox. In some embodiments, warn field 914 may be configured as other types of controls providing a toggleable input or selection indicating a true or false condition, and so forth.

A "post as" field 916 is configured to receive a user selection indicating whether an over allocation should be posted as a positive value or a negative value. In an embodiment, post as field 916 is configured as a drop-down list providing selections (e.g., "positive value" and "negative value") determining how an over allocation should be posted. In some embodiments, post as field 916 may be configured as a checkbox or other type of input control.

A cost center ID field 918 is configured to receive a user selection identifying a cost center ID to which an over allocation should be posted. In an embodiment, a cost center ID may be selected from a plurality of cost center IDs, and the cost center ID field 918 may be a drop-down list or other type of input field, such as a list box, scrollable menu, and so forth.

A cost center name field 920 is configured to receive a user selection identifying a name of the cost center to which an over allocation should be posted. In an embodiment, a cost center name may be selected from a plurality of cost center names, and the cost center name field 920 may be a drop-down list or other type of input field, such as a list box, scrollable menu, and so forth.

An allow under allocations field 922 is configured to receive a user selection indicating whether under allocations are allowed for the new allocation plan. In an embodiment, allow under allocations field 922 is configured as a checkbox. In some embodiments, allow under allocations field 922 may be configured as other types of controls providing a toggleable input or selection indicating a true or false condition, and so forth.

A warn field 924 is configured to receive a user selection indicating whether a warning should be displayed to the user when an under allocation occurs. In an embodiment, warn field 924 is configured as a checkbox. In some embodiments, warn field 924 may be configured as other types of controls providing a toggleable input or selection indicating a true or false condition, and so forth.

A "post as" field 926 is configured to receive a user selection indicating whether an under allocation should be posted as a positive value or a negative value. In an embodiment, post as field 926 is configured as a drop-down list providing selections (e.g., "positive" and "negative") determining how an under allocation should be posted. In some embodiments, post as field 926 may be configured as a checkbox or other type of input control.

A cost center ID field 928 is configured to receive a user selection identifying a cost center ID to which an under allocation should be posted. In an embodiment, a cost center ID may be selected from a plurality of cost center IDs, and the cost center ID field 928 may be a drop-down list or other type of input field, such as a list box, scrollable menu, and so forth.

A cost center name field 930 is configured to receive a user selection identifying a name of the cost center to which an under allocation should be posted. In an embodiment, a name may be selected from a plurality of cost center names, and the cost center name field 930 may be a drop-down list or other type of input field, such as a list box, scrollable menu, and so forth.

A description field 932 is configured to receive a user-supplied description of a new allocation. In an embodiment, description field 932 is a text entry field.

A suspend field 934 is configured to receive a user selection indicating whether the allocation is suspended. A suspended allocation cannot be used. In an embodiment, suspend field 934 is configured as a checkbox. In some embodiments, suspend field 934 may be configured as other types of controls providing a toggleable input or selection indicating a true or false condition, and so forth.

In an embodiment, when a new allocation is added, e.g., via add allocation screen 900, the allocation (e.g., the entered data) is stored in a database or memory structure such as, but not limited to, an allocation table. An allocation table (or other structure) may store a plurality of separate, individual allocations. However, in an embodiment, successive revisions to an individual allocation in the allocation table are recorded in an allocation detail table (or other type of memory structure) rather than in the allocation table. In one embodiment, there may be a separate detail table corresponding to each allocation in the allocation table. In this way, the allocations stored in the allocation table serve as baseline allocations to which subsequent revisions contained in respective detail tables may be applied. In another embodiment, a single detail table (or other memory structure) may store revisions for multiple allocations, such that each revision is identified as associated with a particular baseline allocation.

FIG. 10 depicts an exemplary detail table, suitable for use with an embodiment of the invention, and is generally referred to as detail table 1000. Detail table 1000 is but one example of a detail table, and is not intended to suggest any limitation as to the scope of use or functionality of the technology described herein. Neither should detail table 1000 be interpreted as having any dependency or requirement relating to any one or combination of components illustrated.

As depicted in FIG. 10, the rows represent revisions to a baseline allocation. The "ID" column contains identifiers (IDs) 1002 associated with each allocation revision, e.g., IDs 1 through 13. The "Name" column contains allocation names 1004, e.g., "ALLOC1," associated with the baseline allocation with which the revision is associated. The "Budget Year" column contains allocation years 1006, e.g., "2018," which identify a year associated with the allocation revision. In one embodiment, the year may be a calendar year. In another embodiment, the year may be a fiscal year. In some embodiments, the Budget Year column may represent a period of time other than 12 months. The "Month" column indicates sub-periods, such as a month 1008 (e.g., 1 through 12), in which each revision starts. The "Revision Type" column indicates revision types 1010 which identify the types of corresponding revisions. Exemplary revision types include, but are not limited to, budget and reforecast. The "Allocation Type" column contains identifications of allocation types 1012 which identify the types of the corresponding baseline allocations. Exemplary types may include, but are not limited to, cost center ("CC"), department, or accounts. The various table entries as depicted in FIG. 10 are not necessarily stored in a textual format, but may be stored as numerical or other types of identifiers.

In an embodiment, detail table 1000 stores a limited or minimal amount of data needed to apply an allocation revision to the associated baseline allocation. In other words, a record in the detail table stores the change, or delta, to an allocation, rather than a complete, revised allocation. Detail table 1000 may include more columns than are depicted in FIG. 10. For example, a detail table may include data that identify more specific details of revisions, such as an addition or removal of cost centers within a particular sub-period, changes to how an allocation is distributed between cost centers, and so forth. However, detail table 1000 as shown is abbreviated for the sake of discussion, and includes data that is used in conjunction with a set of rules to determine a proper precedence for applying the allocation revisions to a baseline allocation, as described below.

In an embodiment, allocation revisions stored in detail table 1000 are entered via a user interface screen. The user interface screen may enable allocation changes to be entered at user-specified sub-periods, e.g., start periods, within a given budget period. For example, a change to a percentage allocation may be entered at a specific month within a budget year. In some embodiments, allocation revisions are imported from files or are system generated.

As described above, in an embodiment, detail table 1000 stores allocation revisions as deltas to be applied to a corresponding baseline allocation, storing a limited or minimal amount of data needed to apply a delta to its associated baseline allocation. In that way, the baseline allocation together with the associated deltas may be viewed conceptually as representing variations to, or modifications of, a single allocation. For example, if a particular allocation includes percentage allotments of a resource to multiple cost centers, and a revision to the allocation removes a cost center, then the change may be represented in the stored delta by indicating that the affected cost center's percentage allotment is changed to 0% for that revision, without having to store all of the data associated with other aspects of the allocation, such as any unchanged data associated with the other cost centers. This arrangement of storing a baseline allocation and allocation deltas provides a much more efficient way of storing and maintaining allocation revisions within computer memory as compared to conventional resource allocation systems. In a conventional system, as the number of parameters increase, the amount of data and memory space required to track and maintain revised allocations quickly becomes unmanageable.

For example, using a conventional resource allocation system, an enterprise with 100 employees may create and store a budget having employee resources allocated in a particular way across a number of cost centers. In response to a change mid-year, such as a loss, addition, or reorganization of cost centers, for example, the enterprise may need to re-allocate the employee resources across the new configuration of cost centers. However, because conventional resource allocation systems do not provide a means for adjusting an allocation mid-year, a new allocation must be created that applies for the entire year. For any re-allocations that need to be done, new individual allocations would need to be created. Additionally, the enterprise may desire to prepare multiple, separate allocation revisions for the purpose of comparing different scenarios, as part of planning for a current or future year. Again, a new, complete allocation would be required for each revision. With only 100 employees, a large amount of data is generated and must be stored to represent and maintain the various revisions and scenarios. With 1000 employees, the amount of data required can quickly become unmanageable. Further, conventional systems do not provide an effective means of accessing and reviewing such a massive amount of allocation data, and because allocation revisions must be created and stored as individual allocations, there is no means of maintaining and displaying relationships between allocation revisions.

Unlike conventional systems, in which allocation revisions must be created and stored as individual, separate allocations for the entire year (or budget period), an embodiment of the invention enables modifications to an allocation to be performed mid-year, without having to generate a new, complete allocation for each revision, thus greatly reducing the amount of data required for maintaining the allocation revisions. Additionally, storing revisions as deltas further reduces the amount of data required. An embodiment of the invention also maintains a relationship between a baseline allocation and multiple deltas, which enables allocation revisions to be selectively applied to the baseline allocation in response to user requests.

In addition to the improvements and increased efficiency of computer resource usage, the arrangement of baseline allocations and allocation deltas as described above enables the implementation of a much more efficient and intuitive user interface when displaying and manipulating allocation data, as compared to conventional resource allocation systems. In an embodiment, such a user interface greatly reduces the amount of data that a user must access, scroll through, or select from, to view a particular allocation or generate a report for the allocation data, as described below.

A user interface screen may provide selections of different types of reports that may be generated with regard to a particular allocation. In an embodiment, depending on the type of report selected by the user, some of the allocation revisions in the corresponding detail table may be applicable for generating the report, whereas others may not. Additionally, when multiple allocation revisions within the detail table are applicable for the selected report, the applicable allocation revisions may need to be applied to the allocation in a particular order and/or precedence to generate a correct result. Further, a determination of which revisions are applicable, and the proper order and/or precedence in which to apply the revisions, may depend not only on the type of report selected, but also on the types and specific details of the individual revisions stored in the detail table.

Additionally, a user may store allocation revisions representing different potential scenarios, for example, as a budget planning exercise. When a user enters or selects an allocation revision that represents a particular scenario, similar to generating a report, some of the allocation revisions in the corresponding detail table may be applicable for the particular scenario, whereas others may not, and the applicable allocation revisions may need to be applied to the allocation in a particular order and/or precedence to generate a correct result for the scenario. Further, a determination of which revisions are applicable, and the proper order and/or precedence in which to apply the revisions, may depend not only on the particular scenario, but also on the types and specific details of the individual revisions stored in the detail table.

In an embodiment, a determination of which allocation revisions within a detail table are applicable, and the order in which they need to be applied, is based on a set of allocation revision rules. The allocation revision rules may account for a revision type, an allocation period (such as a budget period, e.g., one year) with which the revision is associated, a sub-period within the allocation period in which the revision takes effect, a length of the sub-period, and the accuracy of data associated with the revision, among other criteria. Allocation revision rules for an embodiment are described more fully below.

Allocation revisions may be regarded conceptually as changes to an allocation applied along a timeline, e.g., applied within a specific period or sub-period, such as in month 4 or in the third quarter within a budget period, e.g., a 12-month period. In an embodiment, allocation revisions may be depicted in a user interface on a timeline, for the purpose of entering an allocation revision and/or viewing an allocation revision and its effect on the overall allocation. An allocation entered via add allocation screen 900 of FIG. 9, for example, may become the baseline allocation in a timeline. A baseline allocation must exist before a user can create allocation revisions. Applying one or more allocation revisions to the baseline allocation results in a new instance of the allocation. In an embodiment, the manner in which allocation revisions are applied to a baseline allocation is determined by a set of allocation rules, as described below.

In an embodiment, allocations roll forward, e.g., a revision applied within a particular sub-period on a timeline is automatically applied to subsequent sub-periods along the timeline. Similarly, an allocation may flow from one budget period to the next budget period along a timeline, and the most recent version of an allocation prior to the beginning of a new budget period may be used as the default allocation for the new budget period. Each allocation revision applied to the timeline may be considered an event. For a given time period, there may be multiple events, and multiple types of events, that could potentially be in effect. For example, a user may wish to view the result of any of a rolling reforecast, an M6 (sixth month) reforecast, a Q2 (second quarter) reforecast, an H1 (first half) reforecast, and a budget. Each of these could require that a different set of events be applied to the baseline allocation. Allocation revision rules determine which events, or revisions, should be applied to generate a correct representation of an allocation instance for different scenarios, such as for an M7 reforecast, or the next year's budget, for example.

In an embodiment, if there are events in specific time periods, such as in M3 and M6, as well as a rolling reforecast for the same year and revision type, the event applied to the first specific time period will roll forward until the second time period, that is, will be applied to any intervening time periods such as M4 and M5. Directly following the M6 time period, the rolling reforecast would be used. The reason for this is that a rolling reforecast is always considered to be "now," and since "now" is always after a reforecast for a specific time period, it will always be after a period specific reforecast for a given year.

In an embodiment, for events associated with a given revision type (e.g. projection, budget, or reforecast), for allocation revisions having overlapping sub-periods, a revision having a higher resolution (e.g., a smaller sub-period) is applied instead of a revision having a lower-resolution low (e.g., a larger sub-period). The determination of a higher or lower resolution (or a smaller or larger sub-period), is determined with reference to the revisions that are being evaluated in comparison with each other. For example, where a first allocation revision for M6 (month 6) and a second allocation revision for Q2 (second quarter) are both present, in which case the revisions overlap (e.g., month six overlaps with quarter two), a comparison of the two sub-periods would determine that M6 is a smaller sub-period than Q2 (M6 being a one-month period and Q2 being a three-month period). Accordingly, the first allocation revision having the shorter sub-period would be applied to the baseline allocation instead of the second allocation revision having the longer sub-period. In other words, a month is more resolute than a quarter.

In an embodiment, for a given budget period (e.g., a fiscal year), allocation revisions are applied to the baseline allocation according to a preferred order based on the revision type associated with each revision. Revision types may include, but are not limited to, projections, budgets or reforecasts. A projection is a prediction for a defined span of multiple years (or budget periods), and is deemed to be the least accurate of the three. A budget is a one year prediction, and is considered to be more accurate than a projection. A reforecast is one or more months of prediction and may be based on prior actuals, and is considered to be more accurate than either a projection or a budget. In an embodiment, the order of preference is from the least accurate revision type to the most accurate revision type. The determination of a least accurate revision type and a most accurate revision type is determined with reference to the particular revisions, or revision types, that are being evaluated in comparison with each other. For example, where a first allocation revision associated with a reforecast, and a second allocation revision associated with a budget, are both present, a comparison of the revision types of the first and second allocation revisions would determine that "budget" type is less accurate than "reforecast." Accordingly, the second allocation revision associated with a budget would be applied to the baseline allocation before the first allocation revision associated with a reforecast. The order of preference is thus to first apply projections, then apply budgets, and then apply reforecasts, to the baseline allocation. Some embodiments may have greater or fewer revision types associated with allocation revisions. In one embodiment, the revision types are budget and reforecast. In an embodiment, if allocation revisions exist for a sub-period "0" and a sub-period "1," e.g., reforecast M0 and reforecast M1, within a budget period, both represent the beginning of the budget period and the allocation data for the sub-period "0" is ignored, e.g., the reforecast M0 is ignored. In an embodiment, all budget data must be allocated, e.g., no allocation revisions are permitted that would result in a portion of budget data not being allocated.

Figure 11:
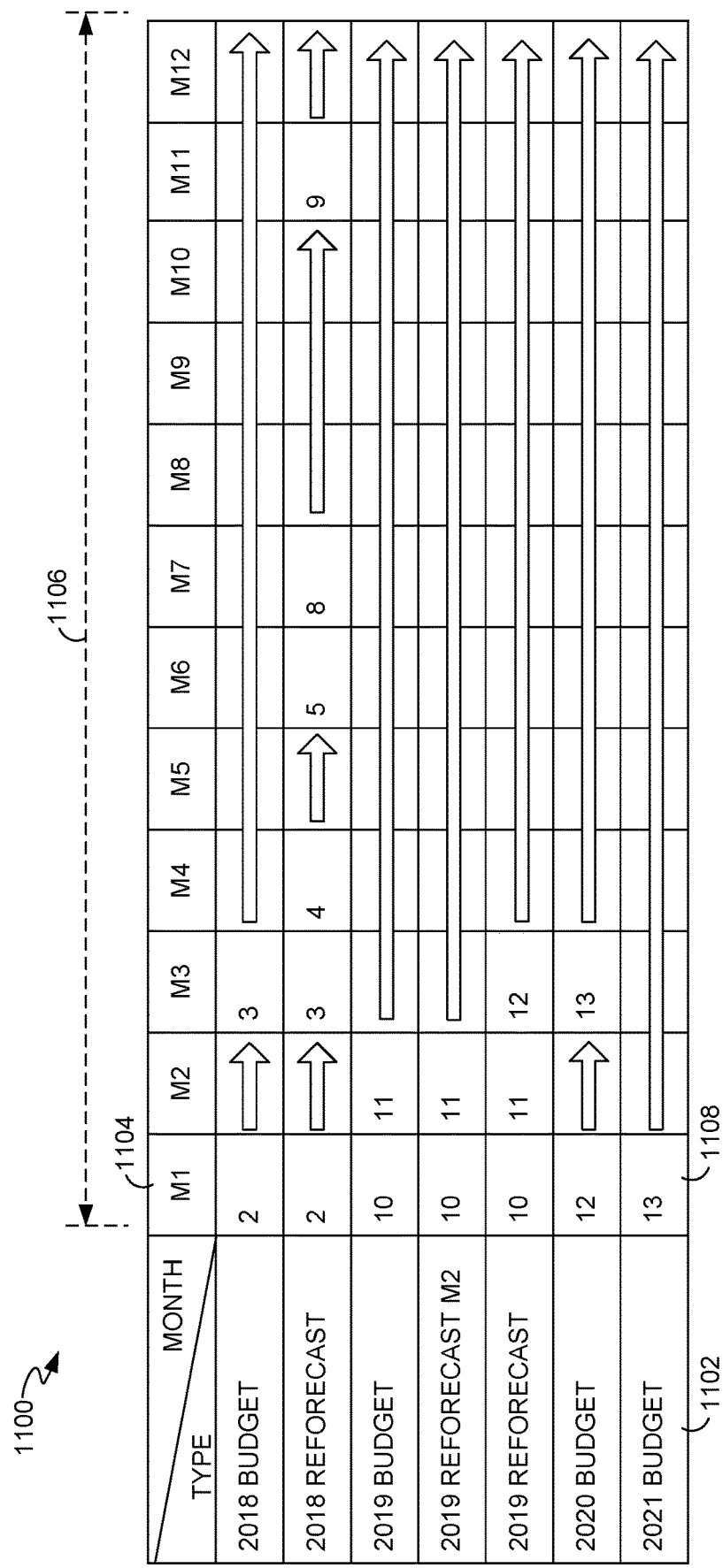
FIG. 11 depicts an exemplary table of effective allocation instances.

FIG. 11 depicts a table of exemplary effective allocation instances as determined from the allocation revisions shown in detail table 1000 of FIG. 10, based on the allocation revision rules, suitable for use with an embodiment of the invention, and is generally referred to as allocation instance table 1100. Allocation instance table 1100 is but one example of effective allocation instances, and is not intended to suggest any limitation as to the scope of use or functionality of the technology described herein. Neither should allocation instance table 1100 be interpreted as having any dependency or requirement relating to any one or combination of components illustrated.

With reference to FIG. 11, the "type" column identifies types of effective allocation instances 1102. The "month" row identifies sub-periods 1104 (e.g., months M1 through M12) within an overall budget period 1106. Each year/type depicted in the "type" column corresponds to a report or action that may be requested by a user. For example, the "2019 Reforecast M2" year/type corresponds to a user request to perform a reforecast of the budget data in month two of 2019, which would thus incorporate the actuals from month one. For each year/type shown in the "type" column, the corresponding row represents a particular effective allocation instance that is generated based on that year/type. The numeric entries 1108 in the month columns correspond to allocation revision identifiers 1002 in FIG. 10, and indicate which allocation revisions from the detail table 1000 have been applied in determining the resultant allocation instance for each particular year/type in the "type" column, based on the allocation revision rules as applied to detail table 1000. An explanation of how the rules are applied for each allocation instance is provided in FIG. 12.

Figure 12:
FIG. 12 depicts an exemplary table of explanations of how rules are applied.

FIG. 12 depicts a table of explanations of how the rules are applied to detail table 1000 for each effective allocation instance in allocation instance table 1100, suitable for use with an embodiment of the invention, and is generally referred to as allocation explanation table 1200. Allocation explanation table 1200 is but one example of allocation explanations for exemplary allocation instances, and is not intended to suggest any limitation as to the scope of use or functionality of the technology described herein. Neither should allocation explanation table 1200 be interpreted as having any dependency or requirement relating to any one or combination of components illustrated.

With reference to FIG. 12, the "allocation instance" column of allocation explanation table 1200 identifies allocation instance types 1202 corresponding to the allocation instance types in the "type" column of allocation instance table 1100. The "year/type/month" column identifies a specific month and event type 1204, indicating the type of event applied in the associated month. For example, for the "2018 Budget" allocation instance, the year/type/month column indicates that a budget event is applied at M1 of 2018. The "ID" column indicates identifiers (IDs) 1206 associated with corresponding revision ID numbers from detail table 1000. For example, continuing with the "2018 Budget" allocation instance, the "ID" column indicates that revision 2 of detail table 1000 is applied. The "explanation" column contains corresponding explanations as to how the rules are applied to detail table 10 to generate each effective allocation instance.

With reference to the "2018 Budget" year/type in FIG. 11, events from detail table 1000 having a year/type of 2018/budget are incorporated. Revision 2 is applied at M1 (month one) and revision 3 is applied at M3. Revision 2 in detail table 1000 represents an initial budget that was applied to the baseline allocation. Because revision 2 was entered with no starting month, it defaults to M1. Revision 3 is a 2018 budget event that starts in month 3, and is applied after revision 2 based on chronological order. The rule regarding the rolling forward of revisions, as described above, determines that revision 2 remains in effect through M2, as indicated by the arrow to the immediate right of revision 2, until M3 when revision 3 takes effect. Revision 3 rolls forward, remaining in effect through M12, as indicated by the arrow to the immediate right of revision 3. Reforecast events for 2018 are not applied, because the order of preference from least accurate to most accurate dictates that a budget is applied before a reforecast, and the request for a "2018 Budget" allocation instance does not request a reforecast. Thus, once the 2018 budget events have been applied to the baseline allocation, the allocation instance is complete. In contrast, a request for a "reforecast" allocation instance would include reforecast events, but the order or preference would dictate that any applicable budget events be applied prior to applying reforecast events, as described in additional examples below.

With reference to the allocation instance of "2018 Reforecast" year/type in FIG. 11, budget events and reforecast events for 2018 from detail table 1000 are considered. The order of preference from least accurate to most accurate dictates that any budgets are applied before reforecasts, so the 2018 budget events are applied to the baseline allocation first.

Similar to "2018 Budget," revision 2 (from detail table 1000) is applied at M1 (month one) and revision 3 is applied at M3. As described above, revision 2 represents an initial budget that was applied to the baseline allocation. Because revision 2 was entered with no starting month, it defaults to M1. Revision 3 is a 2018 budget event that starts in month 3, and is applied after revision 2 based on chronological order. The rule regarding the rolling forward of revisions determines that revision 2 remains in effect through M2, as indicated by the arrow to the immediate right of revision 2, until M3 when revision 3 takes effect.

Once the 2018 budget events have been applied, any applicable 2018 reforecasts are then applied. As depicted in detail table 1000, there are six 2018 reforecasts, identified as revisions 4, 5, 6, 7, 8, and 9. Revisions 5, 6, and 7, are a "reforecast M6," "reforecast H1," and "reforecast Q2," respectively. Thus, the associated sub-periods (M6, H1, and Q2) overlap. The rule regarding precedence of higher-resolution sub-periods over lower-resolution sub-periods within a given revision type, as described above, dictates that revision 5 takes precedence over revisions 6 and 7, because revision 5 specifies a one-month sub-period, which is smaller than either a quarter (3 months) or a half (6 months). Accordingly, revision 5 will be applied to the baseline, but revisions 6 and 7 will not be applied.

Revision 4, a rolling reforecast, is applied (subsequent to having applied revisions 2 and 3, as described above), beginning in M4 as specified in detail table 1000. Because revision 4 begins in M4, revision 3 does not roll forward as it did in the "2018 Budget" allocation instance described above. Revision 4, however, rolls forward to M5. Revision 5, a rolling reforecast, is applied at M6 as specified in detail table 1000. As explained above, revisions 6 and 7 are not applied because revision 5 has precedence over them. Revision 8, a rolling reforecast, is applied at month 7 as specified in detail table 1000. Revision 9, a rolling reforecast (which could represent, for example, some adjustment to the allocation data such as a reapportionment of resources, a change in the number of cost centers, and so forth), is applied at month 11 as specified in detail table 1000, and rolls forward to M12.

With reference to the allocation instance of "2019 Budget" year/type in FIG. 11, all events from detail table 1000 having a year/type of 2019/budget are incorporated. Reforecast events for 2019 are not applied, because the order of preference from least accurate to most accurate dictates that a budget is applied before a reforecast, and the request for a "2019 Budget" allocation instance does not request a reforecast. Thus, once the 2018 budget events have been applied to the baseline allocation, the allocation instance is complete. The budget event revision 10 was not given a start month, and so defaults to M1. Proceeding in chronological order based on start month, revision 10 is applied prior to revision 11 which has a start month of M2. Revision 10 overrides any budget or reforecast events that may have carried over from the prior period (e.g., 2018). Budget event revision 11 is applied at month 2, and rolls forward for M3 through M12 as indicated by the arrow to the immediate right of revision 11.

With reference to the allocation instance of "2019 Reforecast" year/type in FIG. 11, budget events and reforecast events for 2019 from detail table 1000 are considered. The order of preference from least accurate to most accurate dictates that any budgets are applied before reforecasts, so the 2019 budget events are applied to the baseline allocation first.

Budget event revision 10 was not given a start month, and so defaults to M1, and is applied prior to budget event revision 11 which has a start month of M2. Revision 10 overrides any budget or reforecast events that may have carried over from the prior period (e.g., 2018). Budget event revision 11 is applied at M2, and rolls forward for M3 through M12 as indicated by the arrow to the immediate right of revision 11. Revision 12, which is a rolling reforecast event, is applied after the last non-rolling event, and so is applied beginning at M3 and applied successively at M4 through M12.

With reference to the allocation instance of "2020 Budget" year/type in FIG. 11, there is no event starting at M1, so the prior year's (2019) last event (revision 12, rolling reforecast) is inherited as the default allocation for 2020, starting at M1 and rolling forward to M2. The rolling reforecast event revision 13 is applied at M3 and rolls forward from M4 through M12, as indicated by the arrow to the immediate right of revision 13.

With reference to the allocation instance of "2021 Budget" year/type in FIG. 11, the prior year's last event (revision 13) is inherited for the year 2021 at M1. The event rolls forward through M12.

Figure 15:
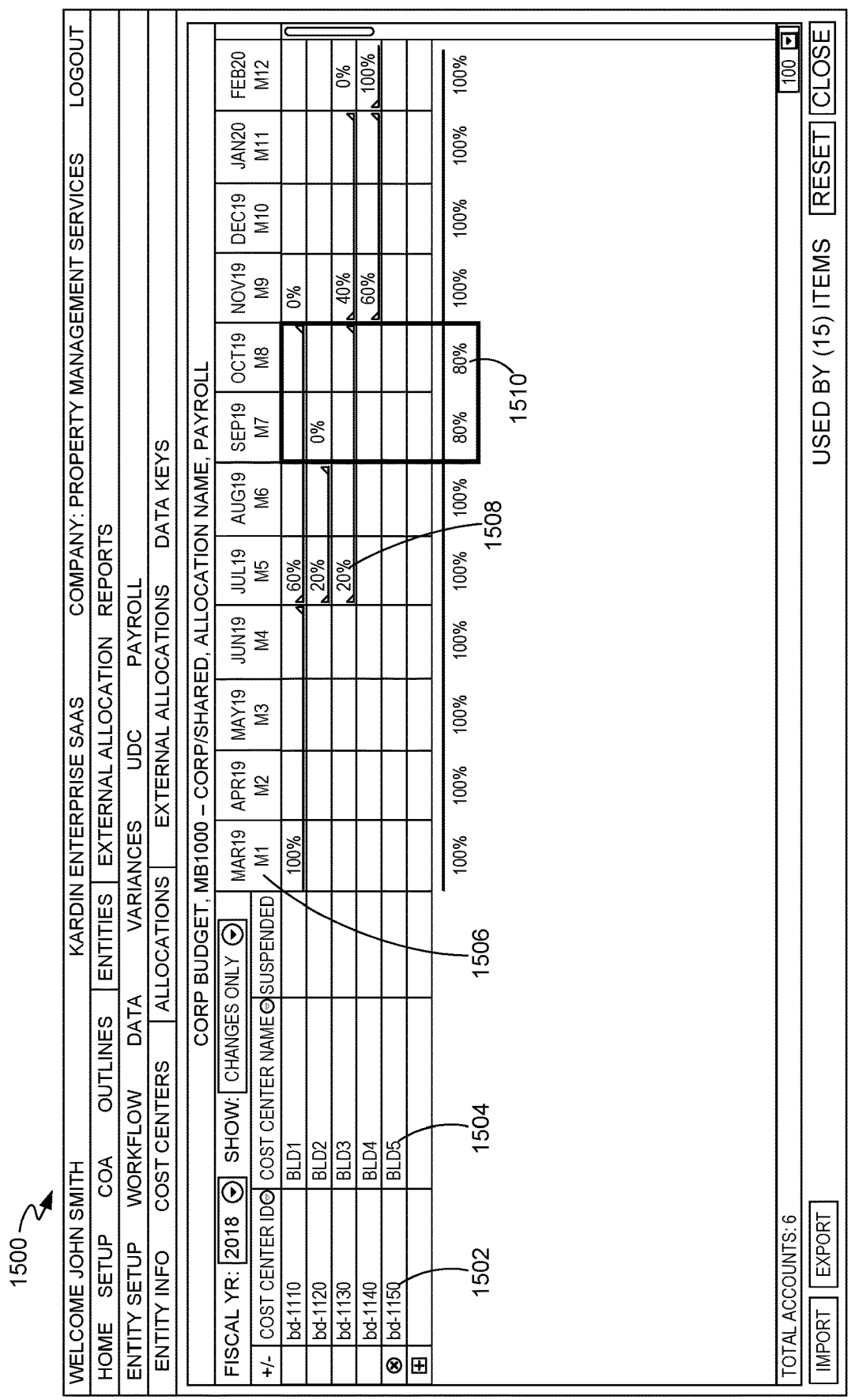
FIG. 15 depicts an exemplary management view of allocation data.

As described above, an allocation may be edited, e.g., revisions may be entered, via one or more user interface screens. FIGS. 13, 14, and 15 depict three different exemplary allocation management views by which an allocation may be edited, e.g., a view of all values, a view of all non-zero values, and a delta timeline view, respectively. FIG. 16 depicts an exemplary allocation list for selecting an allocation to view and/or edit. Each of these is described further below.

With reference to FIG. 13, a management view for a payroll allocation is depicted, suitable for use with an embodiment of the invention, and is generally referred to as management view 1300. Management view 1300 is but one example of an allocation management view, and is not intended to suggest any limitation as to the scope of use or functionality of the technology described herein. Neither should management view 1300 be interpreted as having any dependency or requirement relating to any one or combination of components illustrated.

Management view 1300 depicts a "view of all values" of the allocation amounts assigned to respective cost centers (identified by cost center IDs 1302 and cost center names 1304). As depicted in FIG. 13, months 1306 (M1 through M12) correspond respectively to calendar months March, 2019, through February, 2020. The columns below the months depict respective allocation percentages 1308 allotted to each cost center in each month. All non-zero and zero allocation percentages 1308 are shown in this management view. The allocation percentages 1308 for M7 and M8 are visually highlighted by a heavy border 1310 to indicate that the allocations for M7 and M8 do not total 100%. In some embodiments, other methods of highlighting are used, for example, changing the color of a cell or text, or bolding the text, among others.

With reference to FIG. 14, a management view for a payroll allocation is depicted, suitable for use with an embodiment of the invention, and is generally referred to as management view 1400. Management view 1400 is but one example of an allocation management view, and is not intended to suggest any limitation as to the scope of use or functionality of the technology described herein. Neither should management view 1400 be interpreted as having any dependency or requirement relating to any one or combination of components illustrated.

Management view 1400 depicts a sparse view, e.g., a "view of all non-zero values" of the allocation amounts assigned to respective cost centers (identified by cost center IDs 1402 and cost center names 1404). As depicted in FIG. 14, months 1406 (M1 through M12) correspond respectively to calendar months March, 2019, through February, 2020. The columns below the months depict only the non-zero respective allocation percentages 1408 allotted to each cost center in each month. Because only the non-zero allocation percentages 1408 are shown in this management view, the view is much sparser than in management view 1400, which improves the readability of the resource allocation data in the user interface. The allocation percentages 1408 for M7 and M8 are visually highlighted by a heavy border 1410 to indicate that the allocations for M7 and M8 do not total 100%. In some embodiments, other methods of highlighting are used, for example, changing the color of a cell or text, or bolding the text, among others.

With reference to FIG. 15, a management view for a payroll allocation is depicted, suitable for use with an embodiment of the invention, and is generally referred to as management view 1500. Management view 1500 is but one example of an allocation management view, and is not intended to suggest any limitation as to the scope of use or functionality of the technology described herein. Neither should management view 1500 be interpreted as having any dependency or requirement relating to any one or combination of components illustrated.

Management view 1500 depicts a "delta view" of the allocation amounts assigned to respective cost centers (identified by cost center IDs 1502 and cost center names 1504). As depicted in FIG. 15, months 1506 (M1 through M12) correspond respectively to calendar months March, 2019, through February, 2020. The columns below the months depict only the delta, e.g., only the changes in the allocation percentages 1508 allotted to each cost center in each month. Management view 1500 thus essentially displays a type of summary of the allocation data that particularly highlights the effect of successive allocation revisions, and provides improved readability of the data in a manner similar to a "project plan view." However, it is important to note that the delta view is not a conventional project plan view. Project plan views depict a schedule of tasks required to complete a project based on temporal dependencies between the tasks. For example, in a conventional project plan view, when a first task must be completed before a second task can begin, that is depicted in the project plan view as a link between the end of the first task and the beginning of the second task, such that if the first task is delayed, the delay propagates to the second task. In contrast to a project plan view, the delta view depicted in FIG. 15 depicts changes in allocation amounts, which are not time-dependent on the completion of prior tasks or events. Rather, they are entered by the user (or, in the case of an equal-spread allocation, computed by the system based on user designations as described with regard to FIG. 7), and are selectively applied to a baseline allocation based on allocation revision rules.

Similar to FIGS. 13 and 14, M7 and M8 are visually highlighted by a heavy border 1510 to indicate that the allocations for M7 and M8 do not total 100%. In some embodiments, other methods of highlighting are used, for example, changing the color of a cell or text, or bolding the text, among others.

With reference to FIG. 16, an allocation list interface is depicted, suitable for use with an embodiment of the invention, and is generally referred to as allocation list 1600. Allocation list 1600 is but one example of an allocation list interface, and is not intended to suggest any limitation as to the scope of use or functionality of the technology described herein. Neither should allocation list 1600 be interpreted as having any dependency or requirement relating to any one or combination of components illustrated.

In an embodiment, allocation list 1600 depicts a list of allocations entered via add allocation screen 900 of FIG. 9. For each allocation, an allocation name 1602 is depicted. In an embodiment, an allocation may be viewed via a selection of a view icon 1604, e.g., to access the "view of all values," the "view of all non-zero values," and/or the "delta view," described above with regard to FIGS. 13, 14, and 15.

An allocation may be edited via a selection of an edit icon 1606. In an embodiment, similar to viewing an allocation, editing an allocation may be performed in a "view of all values," a "view of all non-zero values," and/or a "delta view," corresponding to the views described above with regard to FIGS. 13, 14, and 15.

A report for a given allocation in the list may be generated via a selection of a report icon 1608. In various embodiments, types of reports may include one or more of: a user-defined allocations report, which presents the allocation list and the parameters for the different allocations that a user has created; an allocation-details by fiscal year report, which presents varying allocation parameters, such as user assigned percentages or equal-spread and fixed amounts; an over/under allocations report, which presents allocations that have over and under allocations; an allocation errors and warnings report, which presents allocations that have errors or warnings, such as when a resource is not allocated at 100%; and an allocations to cost-center or department report, which depicts which allocations affect which cost centers or departments, which is useful when a cost center represents, for example, a building or project, and the building is sold or the project is shutdown.

Figure 17:
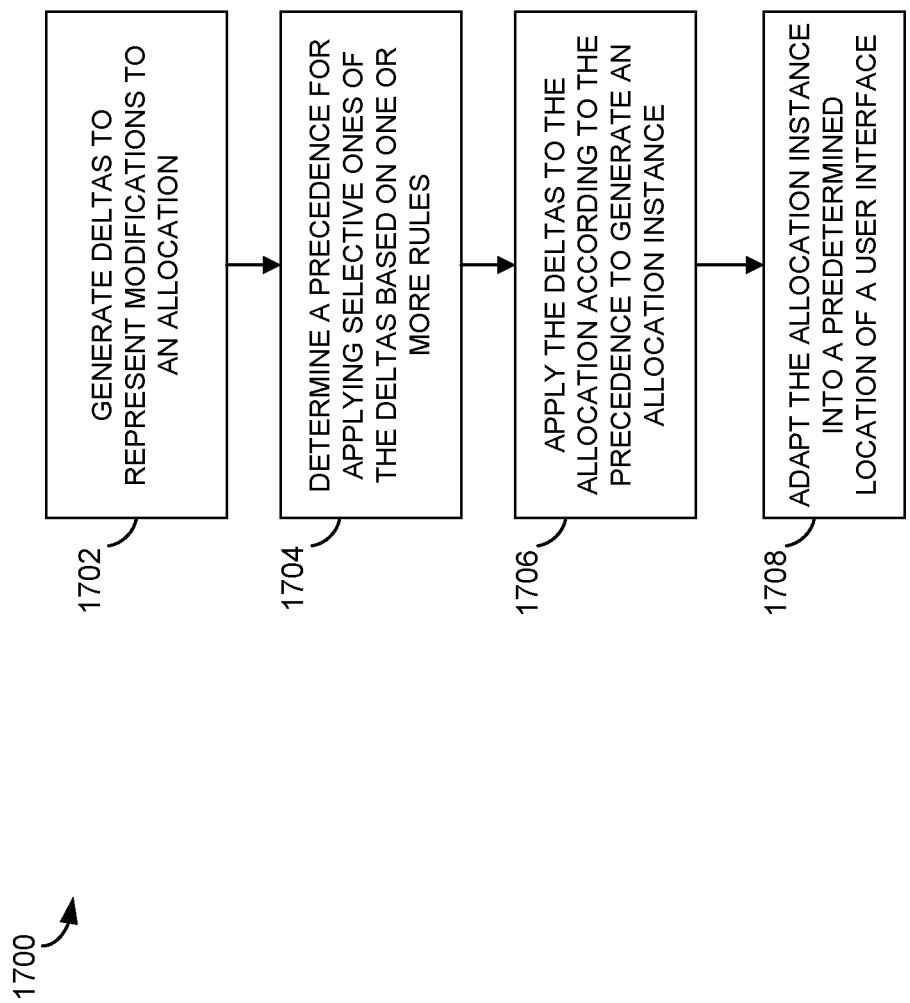
FIG. 17 depicts an exemplary method of managing modifications to an allocation.

Referring now to FIG. 17, a flow diagram is provided that illustrates a method of managing modifications to an allocation, suitable for use with an embodiment of the invention, and is generally referred to as method 1700. Method 1700 is but one example of a method of managing modifications to an allocation, and is not intended to suggest any limitation as to the scope of use or functionality of the technology described herein. Neither should method 1700 be interpreted as having any dependency or requirement relating to any one or combination of components illustrated.

At a step 1702, deltas are generated to represent the modifications to the allocation. Generating a delta may include generating a record of an incremental change that, when applied to the allocation, generates an instance of the allocation that incorporates the given modification. Each delta may be associated with an allocation period, a start period, and a delta type. As described above, representing modifications to an allocation as deltas provides a much more efficient way of storing and maintaining allocation revisions within computer memory as compared to conventional resource allocation systems. Additionally, the configuration of baseline allocations and allocation deltas as described above enables the implementation of a much more efficient and intuitive user interface when displaying and manipulating allocation data, as compared to conventional resource allocation systems. In an embodiment, such a user interface greatly reduces the amount of data that a user must access, scroll through, or select from, to view a particular allocation or generate a report.

In an embodiment, the allocation is selected from an allocation list such as allocation list 1600 described above with regard to FIG. 16. The allocation may have originally been entered into a resource management system via an add allocation screen such as add allocation screen 900 described above with regard to FIG. 9. In an embodiment, the modifications are received by way of a user entry in a management view screen such as management view 1300, management view 1400, and management view 1500, as described above with regard to FIGS. 13, 14, and 15.

At a step 1704, a precedence is determined for applying selective ones of the plurality of deltas to a baseline based on one or more rules. Determining the precedence may include determining a chronological order associated with the plurality of deltas. In an embodiment, the rules include applying a first delta prior to applying a second delta, based on a comparison of a first level of accuracy associated with a type of revision data associated with the first delta, and a second level of accuracy associated with a type of revision data associated with the second delta. Applying the first delta prior to applying the second delta may be determined when the first level of accuracy is less than the second level of accuracy. In other words, a delta associated with a less accurate type of revision data is applied prior to applying a delta associated with a more accurate type of revision data, which may further include one or more of applying a projection prior to applying a budget or a reforecast, or applying a budget prior to applying a reforecast.

The rules may also include excluding one or more of the plurality of deltas from being applied to the allocation. Excluding one or more deltas may include, for a given delta type, excluding a first delta when a starting period of the first delta overlaps with a starting period of a second delta, and the starting period of the second delta is shorter than the starting period of the first delta. Excluding the first delta may include applying a month instead of a quarter year or a half year, or applying a quarter year instead of a half year.

At a step 1706, selective ones of the deltas are applied to the allocation, according to the determined precedence, to generate an allocation instance. At a step 1708, the allocation instance is adapted into a predetermined location of a user interface. As described above with regard to FIGS. 13, 14, and 15, allocation data may be presented in a user interface in different ways, such as a view of all values, a view of all non-zero values, and a delta timeline view. Additionally, a user may request various reports, as described above with regard to FIG. 16.

Figure 18:
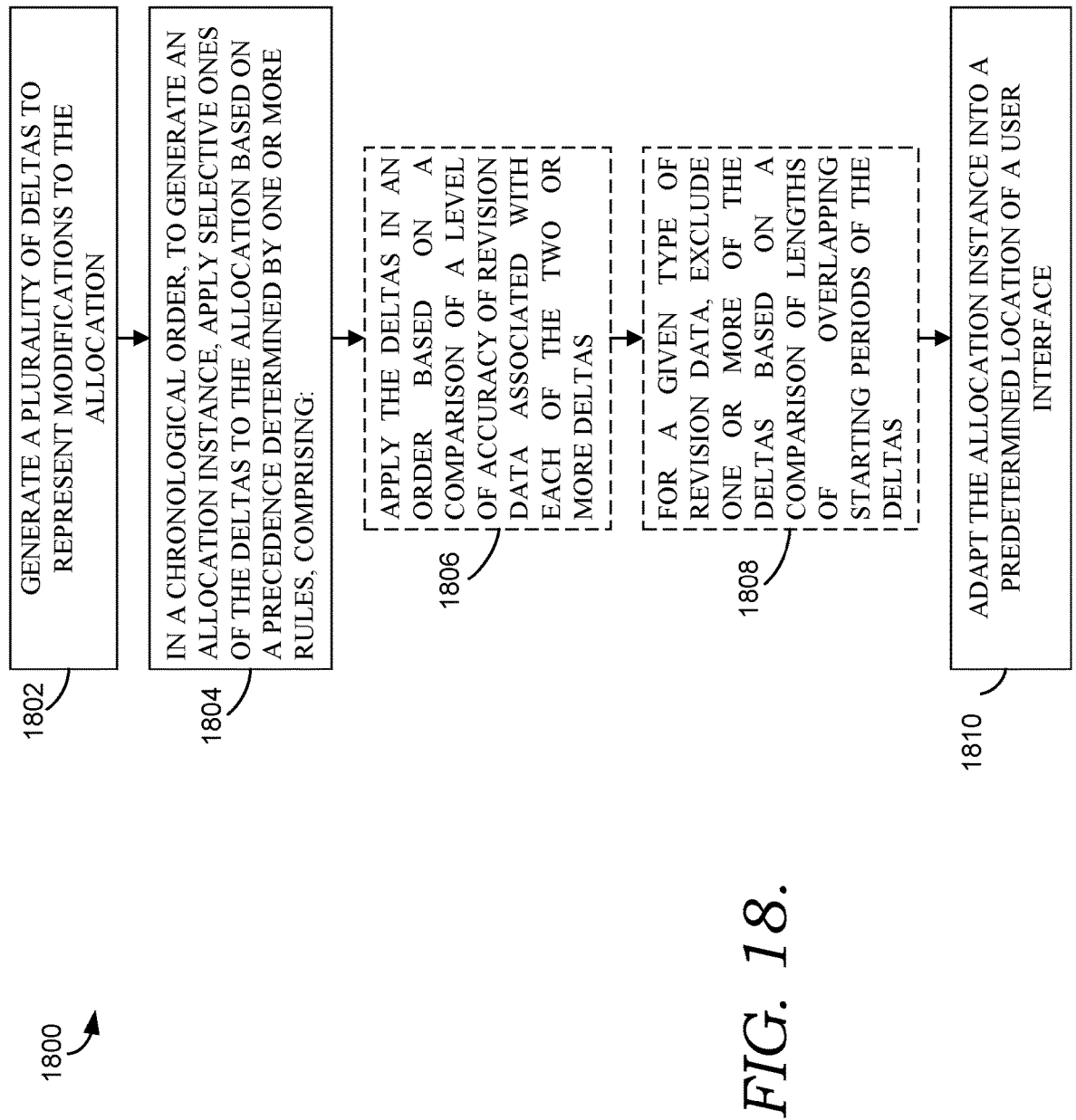
FIG. 18 depicts an exemplary method of managing modifications to an allocation.

Referring now to FIG. 18, a flow diagram is provided that illustrates a method of managing modifications to an allocation, suitable for use with an embodiment of the invention, and is generally referred to as method 1800. Method 1800 is but one example of a method of managing modifications to an allocation, and is not intended to suggest any limitation as to the scope of use or functionality of the technology described herein. Neither should method 1800 be interpreted as having any dependency or requirement relating to any one or combination of components illustrated.

At a step 1802, deltas are generated to represent modifications to the allocation. Generating a delta may include generating a record of an incremental change that, when applied to the allocation, generates an instance of the allocation that incorporates the given modification. In one embodiment, the modifications may be entered by a user in the form of deltas via a user interface screen such as the "delta view" described above with regard to FIG. 15. In other embodiments, the modifications may not be entered as deltas, and the deltas may be determined or calculated from the entered modifications. In an embodiment, the allocation is selected from an allocation list such as allocation list 1600 described above with regard to FIG. 16. The allocation may have originally been entered into a resource management system via an add allocation screen such as add allocation screen 900 described above with regard to FIG. 9. In an embodiment, the modifications are received by way of a user entry in a management view screen such as management view 1300, management view 1400, and management view 1500, as described above with regard to FIGS. 13, 14, and 15.

At a step 1804, proceeding in a chronological order associated with the deltas, an allocation instance is generated by applying selective ones of the plurality of deltas to the allocation based on a precedence determined by one or more rules. In an embodiment, the chronological order is based on a year and a starting period associated with each delta. Applying selective ones of the deltas may include, at a step 1806, applying two or more of the plurality of deltas in an order based on a comparison of a level of accuracy of revision data associated with each of the two or more of the plurality of deltas. Applying the two or more of the plurality of deltas in an order may include applying a first delta prior to applying a second delta when the level of accuracy associated with first delta is less than the level of accuracy associated with the second delta.

Applying selective ones of the deltas may include, at a step 1808, for a given type of revision data, excluding one or more of the plurality of deltas from being applied to the allocation based on a comparison of lengths of overlapping starting periods of the plurality of deltas. Excluding one or more of the plurality of deltas may include excluding a first delta when a starting period of the first delta overlaps with a starting period of a second delta, and the starting period of the second delta is shorter than the starting period of the first delta. For example, applying a delta with a starting period of a month instead of a delta with an overlapping starting period of a quarter year or a half year, or applying a delta with a starting period of a quarter year instead of a delta with a starting period of a half year. In an embodiment, deltas are selectively applied based on a type of report requested by a user.

At a step 1810, the allocation instance generated by applying the selective ones of the deltas to the allocation is adapted into a predetermined location of a user interface. As described above with regard to FIGS. 13, 14, and 15, allocation data may be presented in a user interface in different ways, such as a view of all values, a view of all non-zero values, and a delta timeline view. Additionally, a user may request various reports, as described above with regard to FIG. 16.

Figure 19:
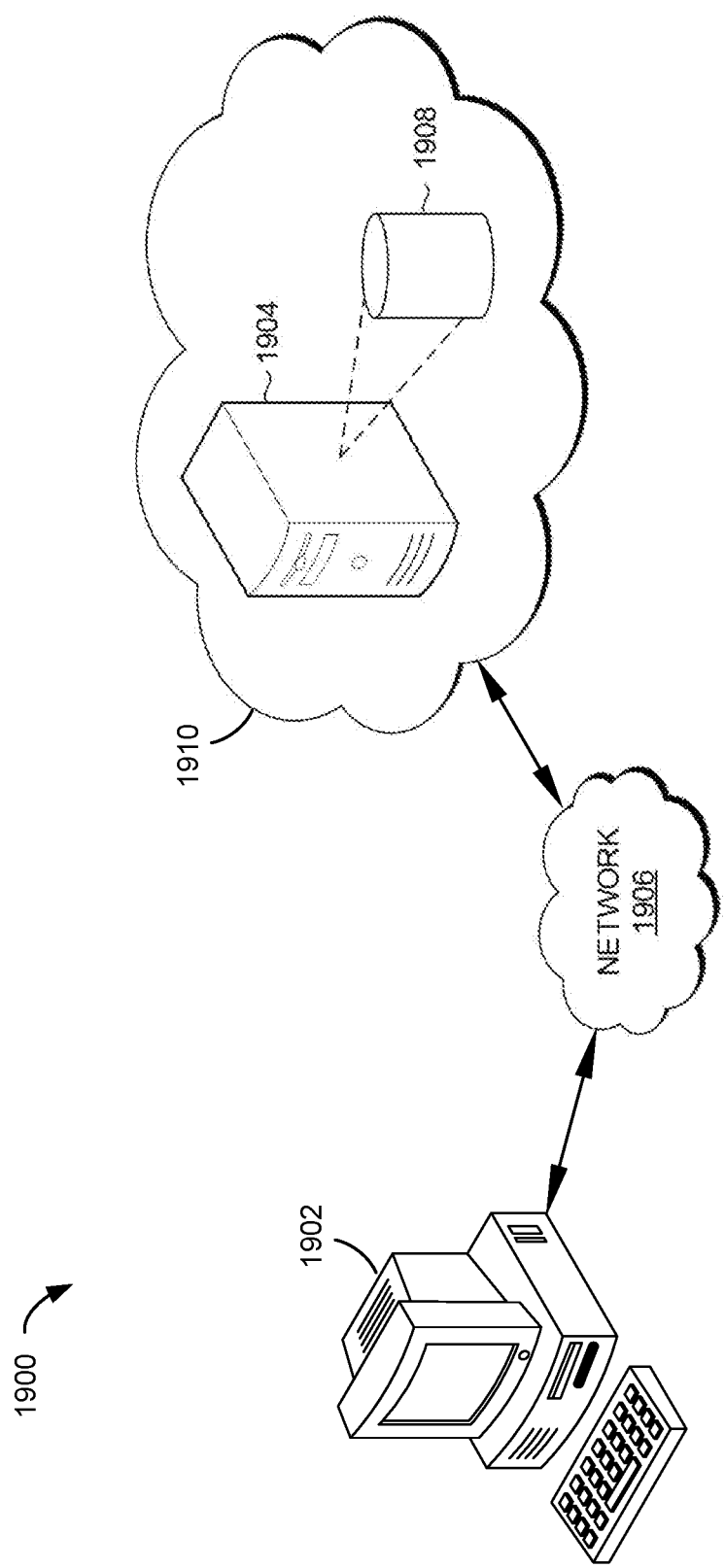
FIG. 19 depicts an exemplary method of managing modifications to an allocation.

Referring now to FIG. 19, a system diagram is provided that illustrates a system for managing modifications to an allocation, suitable for use with an embodiment of the invention, and is generally referred to as system 1900. System 1900 is but one example of a system for managing modifications to an allocation, and is not intended to suggest any limitation as to the scope of use or functionality of the technology described herein. Neither should system 1900 be interpreted as having any dependency or requirement relating to any one or combination of components illustrated.

System 1900 includes a client device 1902, a server 1904, a database 1908, and a network 1906. In some embodiments, system 1900 includes a cloud 1910. Client device 1902 may comprise a computing device 2000 as described below with regard to FIG. 20. Client device 1902 may include a desktop computer, a laptop computer, a smartphone, or other type of computing device capable of communicating with server 1904 via network 1906. Server 1904 may include one or more processors and one or more memories, and may communicate with client device 1902 and database 1908. In some embodiments, server 1904 is a virtual server that runs in cloud 1910. Database 1908 may comprise one or more data storage devices. In an embodiment, database 1908 is a part of server 1904. In some embodiments, database 1908 resides in cloud 1910.

Server 1904 may communicate with client device 1902 by way of network 1906 to receive allocation data input by a user, and to display allocation data to the user in response to user requests. Network 1906 may include such networks as local area networks (LANs), wide area networks (WANs), intranets, the Internet, and other types of communication networks. In an embodiment, server 1904 is configured, by way of one or more processors, to store allocation revisions in database 1908. The allocation revisions may be represented as deltas. In an embodiment, the allocation is selected from an allocation list such as allocation list 1600 described above with regard to FIG. 16, in response to a user selection by way of a user interface on client device 1902. The allocation may have originally been entered into a resource management system by the user via an add allocation screen presented on client device 1902, such as add allocation screen 900 described above with regard to FIG. 9. In an embodiment, the allocation revisions are received by way of a user entry in a management view screen such as management view 1300, management view 1400, and management view 1500, as described above with regard to FIGS. 13, 14, and 15.

In an embodiment, server 1904 is further configured to determine a precedence for applying selective ones of the plurality of deltas to the allocation based on one or more rules. The precedence may include an order in which to apply the deltas. In an embodiment, determining the precedence may include determining to apply a first delta prior to applying a second delta, based on a comparison of a first level of accuracy associated with a type of revision data associated with the first delta, and a second level of accuracy associated with a type of revision data associated with the second delta. Determining to apply the first delta prior to applying the second delta may be based on a determination that the first level of accuracy is less than the second level of accuracy.

Determining the precedence may also include determining to exclude one or more of the plurality of deltas from being applied to the allocation. In an embodiment, determining to exclude one or more of the plurality of deltas includes, for deltas of a given type, excluding a first delta when a starting period of the first delta overlaps with a starting period of a second delta, and the starting period of the second delta is shorter than the starting period of the first delta. In an embodiment, the precedence is further based on a type of report requested by the user.

It should be understood that the figures and embodiments described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Each block of the methods discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Figure 20:
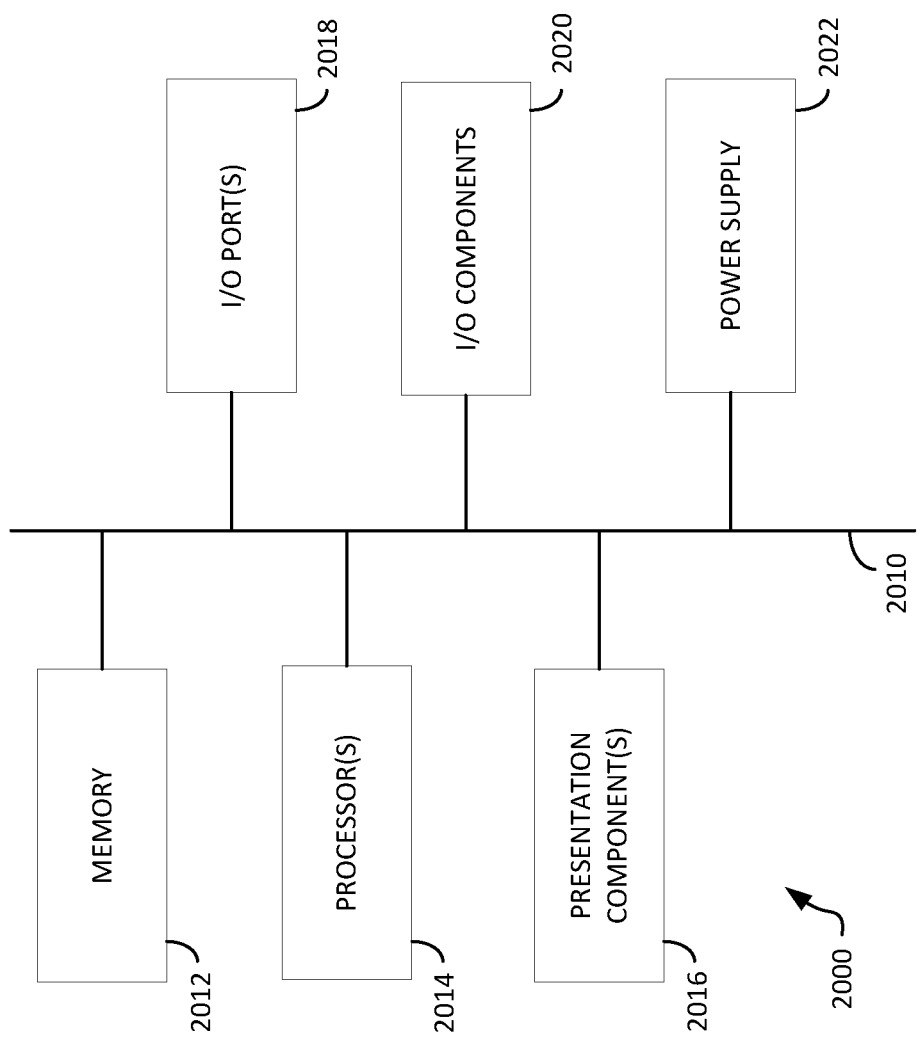
FIG. 20 depicts an exemplary system for managing modifications to an allocation.

Having described some aspects of the technology presented herein, an exemplary operating environment in which aspects of the technology presented herein may be implemented is described below in order to provide a general context for various aspects of the technology presented herein. Referring to FIG. 20 in particular, an exemplary operating environment for implementing aspects of the technology presented herein is shown and designated generally as computing device 2000. Computing device 2000 is but one example of a suitable computing environment and is not intended to suggest any limitation as to the scope of use or functionality of aspects of the technology described herein. Neither should the computing device 2000 be interpreted as having any dependency or requirement relating to any one or combination of components illustrated.

Aspects of the technology provided herein may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Aspects of the technology described herein may be practiced in a variety of system configurations, including hand-held devices, consumer electronics, general-purpose computers, more specialty computing devices, etc. Aspects of the technology described herein may also be practiced in distributed computing environments where tasks are performed by remote-processing devices that are linked through a communications network.

With reference to FIG. 20, computing device 2000 includes a bus 2010 that directly or indirectly couples the following devices: memory 2012, one or more processors 2014, one or more presentation components 2016, input/output (I/O) ports 2018, input/output components 2020, and an illustrative power supply 2022. Bus 2010 represents what may be one or more busses (such as an address bus, data bus, or combination thereof). Although the various blocks of FIG. 20 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 20 is merely illustrative of an exemplary computing device that can be used in connection with one or more aspects of the technology described herein. Distinction is not made between such categories as "workstation," "server," "laptop," "hand-held device," etc., as all are contemplated within the scope of FIG. 20 and reference to "computing device."

Computing device 2000 typically includes a variety of computer-readable media. Computer-readable media can be any available media that can be accessed by computing device 2000 and includes both volatile and nonvolatile media, removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2000. Computer storage media does not comprise signals per se.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2012 includes computer-storage media in the form of volatile and/or nonvolatile memory. The memory may be removable, non-removable, or a combination thereof. Exemplary hardware devices include solid-state memory, hard drives, optical-disc drives, etc. Computing device 2000 includes one or more processors that read data from various entities such as memory 2012 or I/O components 2020. Presentation component(s) 2016 present data indications to a user or other device. Exemplary presentation components include a display device, speaker, printing component, vibrating component, etc.

I/O ports 2018 allow computing device 2000 to be logically coupled to other devices including I/O components 2020, some of which may be built in. Illustrative components include a microphone, joystick, game pad, satellite dish, scanner, printer, wireless device, etc. In some instances, inputs may be transmitted to an appropriate network element for further processing. The technology has been described in relation to particular aspects, which are intended in all respects to be illustrative rather than restrictive. Alternative configurations will become apparent to those of ordinary skill in the art to which the technology described herein pertains without departing from its scope.

From the foregoing, it will be seen that the technology described herein is well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

Embodiments

Embodiment 1. A method of managing modifications to an allocation, comprising: generating a plurality of deltas to represent the modifications to the allocation; determining a precedence for applying selective ones of the plurality of deltas based on one or more rules; applying the plurality of deltas to the allocation according to the precedence to generate an allocation instance; and adapting the allocation instance into a predetermined location of a user interface.

Embodiment 2. The method of embodiment 1, wherein for a given modification to the allocation, generating a delta comprises generating a record of an incremental change that, when applied to the allocation, generates an instance of the allocation that incorporates the given modification.

Embodiment 3. The method of any above embodiments, wherein determining the precedence comprises: determining to apply a first delta prior to applying a second delta, based on a comparison of a first level of accuracy associated with a type of revision data associated with the first delta, and a second level of accuracy associated with a type of revision data associated with the second delta.

Embodiment 4. The method of any above embodiments, wherein applying the first delta prior to applying the second delta is determined when the first level of accuracy is less than the second level of accuracy.

Embodiment 5. The method of any above embodiments, wherein determining to apply the first delta prior to applying the second delta comprises determining to apply a first projection prior to applying a first budget or a first reforecast, or determining to apply a second budget prior to applying a second reforecast.

Embodiment 6. The method of any above embodiments, wherein determining the precedence comprises determining a chronological order associated with the plurality of deltas.

Embodiment 7. The method of any above embodiments, wherein determining the precedence comprises determining to exclude one or more of the plurality of deltas from being applied to the allocation.

Embodiment 8. The method of any above embodiments, wherein determining to exclude one or more of the plurality of deltas comprises: for deltas of a given type, determining to exclude a first delta when a starting period of the first delta overlaps with a starting period of a second delta, and the starting period of the second delta is shorter than the starting period of the first delta.

Embodiment 9. The method of any above embodiments, wherein determining to exclude the first delta when the starting period of the first delta overlaps with the starting period of the second delta, and the starting period of the second delta is shorter than the starting period of the first delta, comprises determining to apply a third delta with a starting period of a month instead of a fourth delta with a starting period of a quarter year or a half year, or determining to apply a fifth delta with a starting period of a quarter year instead of a sixth delta with a starting period of a half year.

Embodiment 10. One or more computer-storage media having embodied thereon computer-usable instructions which, when executed by one or more processors, implement a method of managing modifications to an allocation, comprising: generating a plurality of deltas to represent modifications to the allocation; proceeding in a chronological order associated with the plurality of deltas, generating an allocation instance by applying selective ones of the plurality of deltas to the allocation based on a precedence determined by one or more rules, comprising: applying two or more of the plurality of deltas in an order based on a comparison of a level of accuracy of revision data associated with each of the two or more of the plurality of deltas, and for a given type of revision data, exclude one or more of the plurality of deltas from being applied to the allocation based on a comparison of lengths of overlapping starting periods of the plurality of deltas; and adapting the allocation instance into a predetermined location of a user interface.

Embodiment 11. The media of embodiment 10, wherein for a given modification to the allocation, generating a delta comprises generating a record of an incremental change that, when applied to the allocation, generates an instance of the allocation that incorporates the given modification.

Embodiment 12. The media of any above embodiments, wherein applying the two or more of the plurality of deltas in the order comprises applying a first delta prior to applying a second delta when the level of accuracy associated with first delta is less than the level of accuracy associated with the second delta.

Embodiment 13. The media of any above embodiments, wherein exclude one or more of the plurality of deltas comprises exclude a first delta when a starting period of the first delta overlaps with a starting period of a second delta, and the starting period of the second delta is shorter than the starting period of the first delta.

Embodiment 14. The media of any above embodiments, wherein exclude one or more of the plurality of deltas comprises, for deltas of a given type, exclude a first delta when a starting period of the first delta overlaps with a starting period of a second delta, and the starting period of the second delta is shorter than the starting period of the first delta.

Embodiment 15. A system for managing modifications to an allocation, comprising: one or more memory devices that store a database, wherein the database stores a plurality of deltas generated to represent the modifications to the allocation; one or more processors that: generate the plurality of deltas to represent the modifications to the allocation; determine a precedence for applying selective ones of the plurality of deltas based on one or more rules; apply the plurality of deltas to the allocation according to the precedence to generate an allocation instance; adapt the allocation instance for presentation in a predetermined location of a computer-implemented user interface; and communicate the adapted allocation instance to a user device for presentation in the computer-implemented interface.

Embodiment 16. The system of embodiment 15, wherein for a given modification to the allocation, generate a delta comprises generate a record of an incremental change that, when applied to the allocation, generates an instance of the allocation that incorporates the given modification.

Embodiment 17. The system of any above embodiments, wherein determine the precedence comprises: determine to apply a first delta prior to applying a second delta, based on a comparison of a first level of accuracy associated with a type of revision data associated with the first delta, and a second level of accuracy associated with a type of revision data associated with the second delta.

Embodiment 18. The system of any above embodiments, wherein the determination to apply the first delta prior to applying the second delta is determined when the first level of accuracy is less than the second level of accuracy.

Embodiment 19. The system of any above embodiments, wherein determine the precedence comprises determine to exclude one or more of the plurality of deltas from being applied to the allocation.

Embodiment 20. The system of any above embodiments, wherein determine to exclude one or more of the plurality of deltas comprises: for deltas of a given type, exclude a first delta when a starting period of the first delta overlaps with a starting period of a second delta, and the starting period of the second delta is shorter than the starting period of the first delta.

The invention claimed is:

1. A method of providing reduced computer memory requirements for storing and maintaining dynamic reallocations to enterprise resources, comprising:
receiving, through a graphical user interface, an input indicating a first baseline allocation comprising an allocation of resources to at least one organizational construct;
accessing at least one computer memory that is organized into an allocation table that is computer accessible and a plurality of detail tables that are computer accessible, wherein the allocation table is arranged into records each storing a separate individual baseline allocation, wherein each detail table is associated with a respective record in the allocation table, wherein each detail table maintains deltas associated with baseline allocations in the respective record, and wherein each delta represents an incremental change that may be applied to the respective baseline allocation;
storing the first baseline allocation in a first record of the allocation table;
receiving multiple revisions to the first baseline allocation, each revision corresponding to a separate reallocation of the resources of the first baseline allocation, and each revision comprising modifications to be applied to the first baseline allocation;
for each reallocation, generating a plurality of deltas to represent the modifications associated with the reallocation, each delta indicating a change to be applied to the first baseline allocation;
for each reallocation, storing the plurality of deltas associated with the reallocation in the respective detail table associated with the first baseline allocation, thereby providing the reduced computer memory requirements, wherein the respective detail table associates each delta in the plurality of deltas with the first baseline allocation stored in the first record in the allocation table, thereby maintaining a relationship between the first baseline allocation maintained in the allocation table and the plurality of deltas maintained in the respective detail table;
responsive to a user request to generate a new allocation instance associated with the first baseline allocation, determining a precedence for applying a subset of deltas of the plurality of deltas to the first baseline allocation based on one or more rules, wherein the precedence indicates an order to apply deltas of the subset of deltas to the first baseline allocation to generate the new allocation based on a comparison of attributes, other than a time at which the deltas where generated, associated with two or more deltas of the subset of deltas;
applying the subset of deltas of the plurality of deltas to the first baseline allocation according to the precedence to generate the new allocation instance; and
causing the new allocation instance including the subset of deltas of the plurality of deltas applied to the first baseline allocation according to the precedence to be displayed in a location of the graphical user interface.

2. The method of claim 1, wherein for a given modification to the first baseline allocation, generating the delta comprises generating a record of the incremental change that, when applied to the first baseline allocation, generates the new allocation instance that incorporates the first baseline allocation and the given modification.

3. The method of claim 1, wherein determining the precedence comprises:
  determining to apply a first delta prior to applying a second delta, based on a comparison of a first level of accuracy associated with a type of revision data associated with the first delta, and a second level of accuracy associated with a type of revision data associated with the second delta.

4. The method of claim 3, wherein applying the first delta prior to applying the second delta is determined when the first level of accuracy is less than the second level of accuracy.

5. The method of claim 4, wherein determining to apply the first delta prior to applying the second delta comprises determining to apply a first projection prior to applying a first budget or a first reforecast, or determining to apply a second budget prior to applying a second reforecast.

6. The method of claim 3, wherein determining the precedence comprises determining a chronological order associated with the plurality of deltas.

7. The method of claim 1, wherein determining the precedence comprises determining to exclude one or more of the plurality of deltas from being applied to the baseline allocation.

8. The method of claim 7, wherein determining to exclude one or more of the plurality of deltas comprises:
  for deltas of a given type, determining to exclude a first delta when a starting period of the first delta overlaps with a starting period of a second delta, and the starting period of the second delta is shorter than the starting period of the first delta.

9. The method of claim 8, wherein determining to exclude the first delta when the starting period of the first delta overlaps with the starting period of the second delta, and the starting period of the second delta is shorter than the starting period of the first delta, comprises determining to apply a third delta with a starting period of a month instead of a fourth delta with a starting period of a quarter year or a half year, or determining to apply a fifth delta with a starting period of a quarter year instead of a sixth delta with a starting period of a half year.

10. One or more computer-storage media having embodied thereon computer-usable instructions which, when executed by one or more processors, implement a method of providing reduced computer memory requirements for storing and maintaining dynamic reallocations to a baseline allocation of enterprise resources, comprising:
  receiving input, through a graphical user interface, indicating modifications to the baseline allocation, the baseline allocation stored in an allocation table within at least one computer memory that is computer accessible, wherein the allocation table is arranged into records storing individual baseline allocations;
  generating a plurality of deltas to represent the modifications to the baseline allocation, each delta indicating a change to be applied to the baseline allocation;
  accessing the at least one computer memory that further includes a plurality of detail tables that are computer accessible, wherein each detail table is associated with a respective baseline allocation in the allocation table, wherein each detail table maintains deltas associated with the respective baseline allocation, and wherein each delta represents an incremental change that may be applied to the respective baseline allocation;
  storing the plurality of deltas in a detail table associated with the baseline allocation within the at least one computer memory, the plurality of deltas stored as a minimal amount of data needed to apply the changes to the baseline allocation to generate the modifications, thereby providing the reduced computer memory requirements and maintaining a relationship between the baseline allocation maintained in the allocation table and the plurality of deltas maintained in the detail table;
  proceeding in an order associated with the plurality of deltas, generating a new allocation instance by applying selective ones of the plurality of deltas to the baseline allocation based on a precedence determined by one or more rules used to compare attributes, other than a time at which the plurality of deltas where generated, of two or more deltas of the selective ones of the plurality of deltas, comprising:
    applying two or more of the plurality of deltas in an order based on a comparison of a level of accuracy of revision data associated with each of the two or more of the plurality of deltas, and
    excluding one or more of the plurality of deltas from being applied to the baseline allocation based on a comparison of lengths of overlapping starting periods of the plurality of deltas; and
  causing the new allocation instance to be displayed in a location of Hall the graphical user interface.

11. The media of claim 10, wherein for a given modification to the baseline allocation, generating the delta comprises generating a record of the incremental change that, when applied to the baseline allocation, generates an allocation instance that incorporates the baseline allocation and the given modification.

12. The media of claim 10, wherein applying the two or more of the plurality of deltas in the order comprises applying a first delta prior to applying a second delta when the level of accuracy associated with the first delta is less than the level of accuracy associated with the second delta.

13. The media of claim 10, wherein excluding one or more of the plurality of deltas comprises excluding a first delta when a starting period of the first delta overlaps with a starting period of a second delta, and the starting period of the second delta is shorter than the starting period of the first delta.

14. The media of claim 10, wherein excluding one or more of the plurality of deltas comprises, for deltas of a given type, exclude a first delta when a starting period of the first delta overlaps with a starting period of a second delta, and the starting period of the second delta is shorter than the starting period of the first delta.

15. A system for providing reduced computer memory requirements for storing and maintaining dynamic reallocations to enterprise resources, comprising:
  one or more memory devices that store a database that is computer accessible, wherein the database includes an allocation memory structure that maintains individual baseline allocations, and detail memory structures that maintain a plurality of deltas generated to represent modifications to the baseline allocations;
  one or more processors that:
    receive a baseline allocation comprising an allocation of resources to at least one organizational construct;
    store the baseline allocation in the allocation memory structure;
    receive, through a graphical user interface, input indicating the modifications to the baseline allocation;
    generate the plurality of deltas to represent the modifications to the baseline allocation, each delta indicating an incremental change that can be applied to the baseline allocation in accordance with the modifications obtained through the graphical user interface;

store the plurality of deltas in a detail memory structure without all data associated with other aspects of the baseline allocation, thereby providing the reduced computer memory requirements, the deltas stored with an indication that the deltas are associated with the baseline allocation, thereby maintaining a relationship between the baseline allocation maintained in the allocation memory structure and the plurality of deltas maintained in the detail memory structure;

determine a precedence for applying a subset of deltas of the plurality of deltas to the baseline allocation based on one or more rules, wherein the precedence indicates an order to apply deltas of the subset of deltas to the baseline allocation to generate an allocation instance based on a comparison of attributes, other than a time at which the deltas where generated, associated with two or more deltas of the subset of deltas;

apply the plurality of deltas to the baseline allocation according to the precedence to generate the allocation instance;

adapt the allocation instance for presentation in a predetermined location of the graphical user interface; and communicate the adapted allocation instance to a user device for presentation in the graphical user interface.

16. The system of claim 15, wherein for a given modification to the baseline allocation, generate the delta comprises generate a record of the incremental change that, when applied to the baseline allocation, generates a resultant allocation instance that incorporates the baseline allocation and the given modification.

17. The system of claim 15, wherein determine the precedence comprises:
   determine to apply a first delta prior to applying a second delta, based on a comparison of a first level of accuracy associated with a type of revision data associated with the first delta, and a second level of accuracy associated with a type of revision data associated with the second delta.

18. The system of claim 17, wherein the determination to apply the first delta prior to applying the second delta is determined when the first level of accuracy is less than the second level of accuracy.

19. The system of claim 15, wherein determine the precedence comprises determine to exclude one or more of the plurality of deltas from being applied to the baseline allocation.

20. The system of claim 19, wherein determine to exclude one or more of the plurality of deltas comprises:
   for deltas of a given type, exclude a first delta when a starting period of the first delta overlaps with a starting period of a second delta, and the starting period of the second delta is shorter than the starting period of the first delta.

* * * * *